United States Patent
Ueyama et al.

(10) Patent No.: US 7,285,354 B2
(45) Date of Patent: Oct. 23, 2007

(54) POLYMER ELECTROLYTE FUEL CELL, FUEL CELL ELECTRODE, METHOD FOR PRODUCING ELECTRODE CATALYST LAYER, AND METHOD FOR PRODUCING POLYMER ELECTROLYTE FUEL CELL

(75) Inventors: Yasuhiro Ueyama, Hyogo (JP); Masaru Watanabe, Hyogo (JP); Nobuyuki Kamikihara, Osaka (JP); Eiichi Yasumoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 10/757,725

(22) Filed: Jan. 15, 2004

(65) Prior Publication Data

US 2004/0209138 A1   Oct. 21, 2004

Related U.S. Application Data

(63) Continuation-in-part of application No. PCT/JP03/02973, filed on Mar. 13, 2003.

(30) Foreign Application Priority Data

Mar. 14, 2002   (JP) .............................. 2002-070350

(51) Int. Cl.
  *H01M 4/00*   (2006.01)
  *H01M 8/10*   (2006.01)
  *B05D 5/12*   (2006.01)
(52) U.S. Cl. ..................... 429/44; 429/30; 427/115
(58) Field of Classification Search ................. 429/30, 429/44; 427/115; 502/101
  See application file for complete search history.

(56) References Cited

U.S. PATENT DOCUMENTS

| 4,664,988 A | 5/1987 | Shigeta et al. ................. 429/44 |
| 5,344,668 A | 9/1994 | Rempe et al. ................. 427/115 |
| 6,210,789 B1 | 4/2001 | Hanrahan ..................... 429/324 |
| 6,489,051 B1 | 12/2002 | Inoue ........................... 429/34 |
| 6,524,736 B1* | 2/2003 | Sompalli et al. ............... 429/42 |
| 6,544,680 B1 | 4/2003 | Takano et al. ................. 429/34 |
| 7,091,149 B2* | 8/2006 | Iwasaki et al. ............. 502/101 |

(Continued)

FOREIGN PATENT DOCUMENTS

| JP | 629025 | 2/1994 |
| JP | 8148152 | 6/1996 |
| JP | 9245801 | 9/1997 |
| JP | 2000 299119 | 10/2000 |
| JP | 2001 38268 | 2/2001 |

*Primary Examiner*—Patrick Joseph Ryan
*Assistant Examiner*—Thomas H. Parsons
(74) *Attorney, Agent, or Firm*—Stevens, Davis, Miller & Mosher, LLP

(57) ABSTRACT

A method for producing a polymer electrolyte membrane type fuel cell including a polymer electrolyte membrane, fuel and air electrodes that sandwich therebetween the polymer electrolyte membrane and that each include a gas diffusion layer and a catalyst layer provided in contact with the polymer electrolyte membrane, and separators provided in contact with the gas diffusion layers. A paste containing at least a carbon powder having a catalyst supported thereon is spread over a predetermined support, and the coated support is dried to form the catalyst layer. A cracking occupation area on the electrodes is controlled to a predetermined tolerance by controlling at least one of (1) a thickness of the catalyst layer, (2) a kind of carbon having the catalyst supported thereon, and (3) a drying rate of a solvent of the paste.

7 Claims, 16 Drawing Sheets

U.S. PATENT DOCUMENTS

| | | |
|---|---|---|
| 2001/0024748 A1 | 9/2001 | Mizuno et al. |
| 2002/0051903 A1 | 5/2002 | Masuko et al. |
| 2002/0160252 A1 | 10/2002 | Hirahara et al. |
| 2002/0164516 A1 | 11/2002 | Hasegawa et al. |
| 2002/0166694 A1 | 11/2002 | Nishide et al. |
| 2002/0192538 A1 | 12/2002 | Tanahashi et al. |
| 2003/0175579 A1 | 9/2003 | Uchida et al. |
| 2003/0194599 A1 | 10/2003 | Sassa et al. |
| 2003/0209428 A1 | 11/2003 | Hirahara et al. |

* cited by examiner

POLYMER ELECTROLYTE FUEL CELL, FUEL CELL ELECTRODE, METHOD FOR PRODUCING ELECTRODE CATALYST LAYER, AND METHOD FOR PRODUCING POLYMER ELECTROLYTE FUEL CELL

This application is a continuation-in-part of PCT/JP03/02973 filed Mar. 13, 2003.

TECHNICAL FIELD

The present invention relates to polymer electrolyte membrane type fuel cells and methods of making such fuel cells.

RELATED ART

Operation of a fuel cell involves an electrochemical reaction of a fuel gas with an oxidizer gas containing oxygen, such as air, to generate electric power energy. A polymer electrolyte type fuel cell is one kind of fuel cell. An example of a single cell constituting a polymer electrolyte type fuel cell is shown in FIG. 1.

In FIG. 1, the single cell includes a polymer membrane 1 that is used as a hydrogen ionically-conductive membrane, a fuel electrode 2 including a catalyst layer and a gas diffusion layer that is formed by a carbon sheet and a water-repellent layer, an air electrode 3 including a gas diffusion layer and a catalyst layer which are similar to those of fuel electrode 2, and separators 4 and 5 that act to prevent mixing of hydrogen supplied onto the fuel electrode 2 and air supplied onto the air electrode 3 in a fuel cell assembly having single cells bonded to each other.

This polymer electrolyte type fuel cell is prepared as follows. A carbon powder having a noble metal catalyst supported thereon (hereinafter referred to as a "catalyst-supporting carbon powder") as a catalyst body is mixed with a binder resin to prepare a catalyst layer paste. A gas diffusion layer is formed by, for example, a carbon paper having both permeability, to fuel gas containing hydrogen, and electronic conductivity that has been subjected to a water repellent treatment. The paste is then spread over the gas diffusion layer to form a catalyst layer thereon, thereby preparing an electrode. Therefore, the step of preparing a paste is occasionally referred to as a step of preparing a coating compound.

In order to render this catalyst layer smooth and free of agglomerate, it is necessary that the paste be subjected to mixing at a high shear rate to accelerate the formation of the catalyst-supporting carbon powder into primary particles.

Subsequently, the prepared electrode is bonded to one side of a polymer electrolyte membrane, which selectively transports hydrogen ions, and a similar electrode is bonded to the other side of the polymer electrolyte membrane. Together, the two electrodes and the polymer electrolyte membrane constitute a single cell. As the polymer electrolyte membrane, there is normally used a perfluorosulfonic acid which is a hydrogen ionically-conductive polymer electrolyte.

The binding resin used to prepare the catalyst layer is selected to enhance the bonding properties of the catalyst layer with both the gas diffusion layer and the polymer electrolyte membrane. As the binder resin, there is normally used a perfluorosulfonic acid as in the case of the polymer electrolyte membrane.

To further enhance the bonding properties of the binder resin, a fluororesin, such as polytetrafluoroethylene and polyvinylidene fluoride, is incorporated into the resin.

Methods of producing such a related art polymer electrolyte type fuel cell include those disclosed in JP-A-2001-38268 and JP-A-6-29025, which are hereby incorporated by reference in their entirities.

Prectical factors require a polymer electrolyte membrane type fuel cell to have a lifetime of at least 5,000 hours. Heretofore, the main factors affecting fuel cell lifetime was unknown, and, as a result, the yield of such fuel cells has been low.

SUMMARY OF THE INVENTION

An aim of the present invention is to provide a method of producing a polymer electrolyte membrane type fuel cell which supports the production of a high quality polymer electrolyte type fuel cell, does not leak and exhibits improved life performance in a high production yield.

The present inventors have determined the following. When the polymer electrolyte membrane type fuel cell produced by the related art method has a short lifetime, the catalyst layer has many pinholes or cracking. Such cracking causes the occurrence of a current density distribution that deteriorates the discharge performance. Also, the catalyst layer may break off at the cracked area, thereby deteriorating the life performance of the cell.

Additionally, the present inventors have studied the cause of such cracking. From this study, the inventors have discovered the following facts. The catalyst-supporting carbon powder is a particulate material comprising primary particles, having a diameter of not greater than about 100 nanometers (nm), that tend to undergo agglomeration. The particles remain primary shortly after being mixed at a high shear rate, but undergo agglomeration with the evaporation of the solvent of the solution in which they are dissolved during spreading and drying. This agglomeration creates pinholes or cracking in the catalyst layer.

From these considerations, the present inventors have discovered that an improvement of the spreading and drying process makes it possible to produce a polymer electrolyte membrane type fuel cell which undergoes little or no cracking.

Also, the present inventors have studied the relationship between the properties of the electrode coat layer and the discharge performance of a fuel cell, through volume resistivity measurements of the catalyst layer. The measurements show that electrodes having a large amount of pinholes or cracking exhibit a high volume resistivity, while electrodes free of pinholes or cracking exhibit a low volume resistivity. The inventors also discovered that a fuel cell electrode having a low volume resistivity does not leak and, thus, provides a polymer electrolyte type fuel cell having improved life performance.

The present invention has been developed through the circumstances of the inventors' analysis.

Accordingly, a first aspect of the present invention lies in a method of producing a polymer electrolyte membrane type fuel cell having a polymer electrolyte membrane and electrodes that each contain a gas diffusion layer and a catalyst layer, which is provided in contact with the polymer electrolyte membrane. The electrodes are disposed on the respective sides of the polymer electrolyte membrane, and a separator is provided in contact with the gas diffusion layer of each electrode. While spreading a paste, containing at least a carbon powder (for example, a finely divided powder) having a catalyst (for example, a noble metal catalyst) supported thereon, over a predetermined support and drying the coated support to form the catalyst layer, the cracking occupation area on the electrodes is controlled to a predetermined tolerance. The cracking occupation area on the electrodes is controlled by controlling the: (1) thickness of the catalyst layer, (2) kind of carbon having the catalyst supported thereon and (3) drying rate of a solvent of the paste.

A second aspect of the present invention lies in a method of producing a polymer electrolyte membrane type fuel cell, as described in the first aspect of the present invention, wherein the tolerance of the cracking occupation area is not greater than about 25%.

A third aspect of the present invention lies in a method of producing a polymer electrolyte membrane, type fuel cell having a polymer electrolyte membrane and electrodes that each contain a gas diffusion layer and a catalyst layer, which is provided in contact with the polymer electrolyte membrane. The electrodes are disposed on the respective sides of the polymer electrolyte membrane, and a separator is provided in contact with the gas diffusion layer of each electrode. While spreading a paste, containing at least a carbon powder having a catalyst supported thereon, over a predetermined support and drying the coated support to form the catalyst layer, the volume resistivity of the catalyst layer is controlled to a predetermined tolerance by controlling at least (1) thickness of the catalyst layer, (2) kind of carbon having the aforementioned catalyst supported thereon and (3) drying rate of a solvent of the paste.

A fourth aspect of the present invention lies in a method of producing a polymer electrolyte membrane type fuel cell of the third aspect, wherein the tolerance of the volume resistivity is not greater than about 100 ohms·centimeters ($\Omega \cdot cm$).

A fifth aspect of the present invention lies in the method of producing a polymer electrolyte membrane type fuel cell of the first or third aspect, wherein the thickness is predetermined to be from about 10 microns ($\mu m$) to about 25 $\mu m$. The kind of carbon having the catalyst supported thereon is predetermined to be carbon having from about 5 weight wt % to about 20 wt % of platinum supported thereon, and the drying rate of the solvent is predetermined to be from about 2.5 milligrams/square centimeter·minutes ($mg/cm^2 \cdot min$) to about 20 $mg/cm^2 \cdot min$.

A sixth aspect of the present invention lies in a method of producing a polymer electrolyte membrane type fuel cell of the fourth aspect, wherein the ratio of the volume resistivity of the catalyst layer to the volume resistivity of the gas diffusion layer (i.e., volume resistivity of catalyst/volume resistivity of gas diffusion layer) is not greater than about $10^7$.

A seventh aspect of the present invention lies in a method of producing a polymer electrolyte membrane type fuel cell of the first or third aspect, wherein the drying rate of the solvent is adjusted by controlling the kind of solvent, the drying temperature, or both the solvent and drying temperature used in producing the fuel cell.

An eighth aspect of the present invention lies in a method of producing a polymer electrolyte membrane type fuel cell of any of the first to seventh aspects, wherein the polymer electrolyte membrane type fuel cell is used as a household fuel cell.

A ninth aspect of the present invention lies in a polymer electrolyte membrane type fuel cell having a polymer electrolyte membrane and electrodes that each contain a gas diffusion layer and a catalyst layer which is provided in contact with the polymer electrolyte membrane. The electrodes are disposed on the respective sides of the polymer electrolyte membrane, and a separator is provided in contact with the gas diffusion layer of each electrode. While spreading a paste, containing at least a carbon powder (for example, a finely divided powder) having a catalyst (for example, a noble metal catalyst) supported thereon, over a predetermined support and drying the coated support to form the catalyst layer, the cracking occupation area on the electrodes is controlled to a predetermined tolerance. This control is achieved by controlling the: (1) thickness of the catalyst layer, (2) kind of carbon having the catalyst supported thereon and (3) drying rate of the solvent of the paste.

A tenth aspect of the present invention lies in a polymer electrolyte membrane type fuel cell of the ninth aspect, wherein the tolerance of the cracking occupation area is not greater than about 25%.

An eleventh aspect of the present invention lies in a polymer electrolyte membrane type fuel cell having a polymer electrolyte membrane and electrodes that each contain a gas diffusion layer and a catalyst layer which is provided in contact with the polymer electrolyte membrane. The electrodes are disposed on the respective sides of the polymer electrolyte membrane, and a separator is provided in contact with the gas diffusion layer of each electrode. While spreading a paste, containing at least a carbon powder (for example, a finely divided powder) having a catalyst (for example, a noble metal catalyst) supported thereon, over a predetermined support and drying the coated support to form the catalyst layer, the volume resistivity of the catalyst layer is controlled to a predetermined tolerance by controlling at least the: (1) thickness of the catalyst layer, (2) kind of carbon having the catalyst supported thereon and (3) drying rate of a solvent of the paste.

A twelfth aspect of the present invention lies in the polymer electrolyte membrane type fuel cell of the eleventh aspect, wherein the tolerance of the volume resistivity is not greater than about 100 $\Omega \cdot cm$.

A thirteenth aspect of the present invention lies in a polymer electrolyte membrane type fuel cell of the ninth or the eleventh aspect wherein, the thickness is predetermined to be from about 10 $\mu m$ to about 25 $\mu m$, the kind of carbon having the catalyst supported thereon is predetermined to be carbon having from about 5 wt % to about 20 wt % of platinum supported thereon, and the drying rate of the solvent is predetermined to be from about 2.5 $mg/cm^2 \cdot min$ to about 20 $mg/cm^2 \cdot min$.

A fourteenth aspect of the present invention lies in a polymer electrolyte membrane type fuel cell of the twelfth aspect, wherein the ratio of the volume resistivity of the catalyst layer to the volume resistivity of the gas diffusion layer is not greater than about $10^7$.

A fifteenth aspect of the present invention lies in a polymer electrolyte membrane type fuel cell of any one of the ninth to fourteenth aspects, wherein the polymer electrolyte membrane type fuel cell is used as a household fuel cell.

A sixteenth aspect of the present invention lies in a polymer electrolyte membrane type fuel cell having a polymer electrolyte membrane and electrodes that each contain a gas diffusion layer and a catalyst layer, which is provided in contact with the polymer electrolyte membrane. The electrodes are disposed on respective sides of the polymer electrolyte membrane, and a separator is provided in contact with the gas diffusion layer of each electrode. Also, the volume resistivity of the catalyst layer is not greater than about 100 $\Omega \cdot cm$.

A seventeenth aspect of the present invention lies in a polymer electrolyte membrane type fuel cell having a polymer electrolyte membrane and electrodes that each contain a gas diffusion layer and a catalyst layer, which is provided in contact with the polymer electrolyte membrane. The electrodes are disposed on respective sides of the polymer electrolyte membrane, and a separator is provided in contact with the gas diffusion layer of each electrode. Also, the ratio of the volume resistivity of the catalyst layer to the volume resistivity of the gas diffusion layer is not greater than about $10^7$.

A further aspect of the invention lies in a method of producing a catalyst layer for a fuel cell electrode. According to this method, a catalyst-supporting carbon powder is mixed with a catalyst in a weight ratio of catalyst to carbon powder within the range of about 5% to about 20%. The mixture of carbon powder and catalyst is dissolved in a solvent to produce a solution. The solution is applied to a support and dried.

A further aspect of the invention lies in a method of producing a catalyst layer for a fuel cell electrode. According to this method, a catalyst-supporting carbon powder is mixed with a catalyst. The mixture of carbon powder and catalyst is dissolved in a solvent to produce a solution. The solution is applied to a support and dried to produce a dried catalyst layer having a thickness within the range of about 10 μm to about 25 μm.

A further aspect of the invention lies in a method of producing a catalyst layer for a fuel cell electrode. According to this method, a catalyst-supporting carbon powder is mixed with a catalyst. The mixture of carbon powder and catalyst is dissolved in a solvent to produce a solution. The solution is applied to a support and dried at a drying rate within the range of about 2.5 mg/cm$^2$·min to about 50 mg/cm$^2$·min.

A further aspect of the invention lies in an electrode for a fuel cell. The electrode includes a support and a catalyst layer, disposed on the support, having a catalyst-supporting carbon powder and a catalyst in a weight ratio of catalyst to carbon powder within the range of about 5% to about 20%.

A further aspect of the invention lies in an electrode for a fuel cell. The electrode includes a support and a catalyst layer, disposed on the support, having a thickness within the range of about 10 μm to about 25 μm.

A further aspect of the invention lies in an electrode for a fuel cell. The electrode includes a support and a catalyst layer disposed on the support. The catalyst layer is produced by mixing a catalyst-supporting carbon powder with a catalyst, dissolving the mixture of carbon powder and catalyst in a solvent to produce a solution, applying the solution to the support, and drying the applied solution at a drying rate within the range of about 2.5 mg/cm$^2$·min to about 50 mg/cm$^2$·min, to produce a catalyst layer,having a volume resistivity that is no greater than about 20 ohms·cm.

A further aspect of the invention lies in an electrode for a fuel cell. The electrode includes a support and a catalyst layer disposed on the support. The catalyst layer is produced by mixing a catalyst-supporting carbon powder with a catalyst, dissolving the mixture of carbon powder and catalyst in a solvent to produce a solution, applying the solution to the support, and drying the applied solution at a drying rate within the range of about 2.5 mg/cm$^2$·min to about 50 mg/cm$^2$·min, to produce a catalyst layer having a cracking occupation area ratio that is no greater than about 25 percent.

The mechanism of cell performance deterioration due to cracking is considered to operate as follows.

When the cracking occupation area exceeds about 25%, the catalyst area decreases. To maintain a constant current flow as the catalyst area decreases, the current density through the decreased area must be increased. During the operation of the fuel cell, heat is generated by the reaction of the fuel gas and air. The increased current density causes the temperature to rise locally at the portions of the catalyst layer experiencing the increased current density. The increased temperature deteriorates the electrically-conductive polymer and thus reduces its life. Moreover, when the cracking occupation area exceeds about 25%, it induces flooding (i.e., an accumulation of water produced by the reaction) in voids formed by the cracking, thereby reducing the electricity generation efficiency. Furthermore, when the cracking occupation area exceeds about 25%, the catalyst layer has a reduced area. Thus, at the time of clamping a laminate of a gas diffusion layer, catalyst layer, polymer membrane, catalyst layer, gas diffusion layer and separator, the reduced area of the catalyst layer receives a more concentrated clamping pressure. As a result, flooding is induced, deteriorating the electricity generation efficiency.

DETAILED DESCRIPTION

Illustrative embodiments of the present invention will be described hereinafter.

Figure 15:
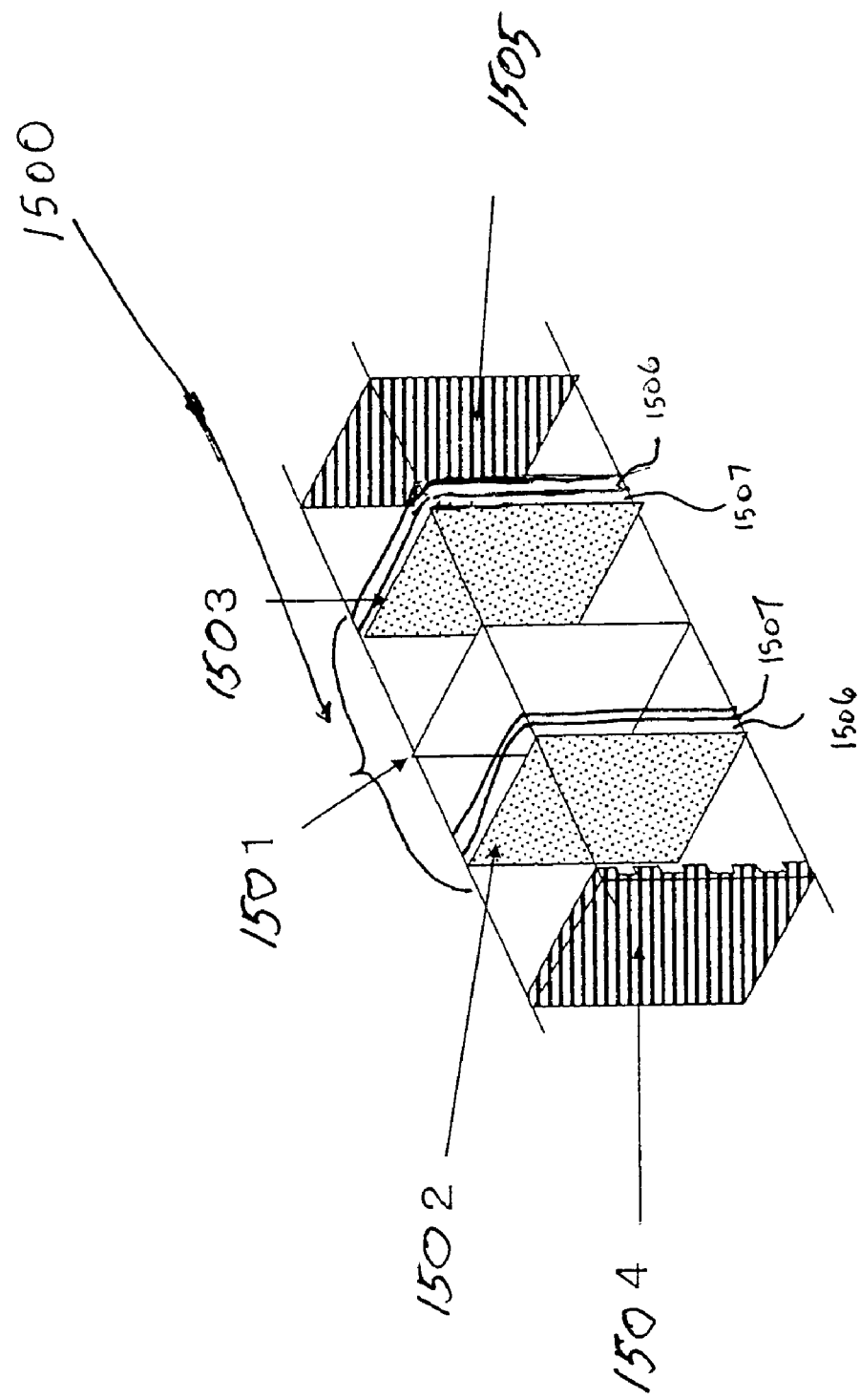
FIG. 15 illustrates a unit fuel cell of the invention.

FIG. 15 illustrates a unit cell 1500 of the invention including a fuel electrode 1502 and an air electrode 1503, each formed by a gas diffusion layer 1506 and a catalyst layer 1507, and a hydrogen ionically-conductive polymer membrane 1501 sandwiched between the two electrodes. The gas diffusion layer is formed by a carbon sheet and a water-repellent layer. Separators 1504 and 1505, which prevent the mixing of hydrogen supplied onto the fuel electrode and air supplied onto the air electrode, sandwich between them the laminate of polymer electrolyte membrane 1501 and the fuel and air electrodes 1502 and 1503, respectively, and separate individual cells in a stack from one another.

Figure 16:
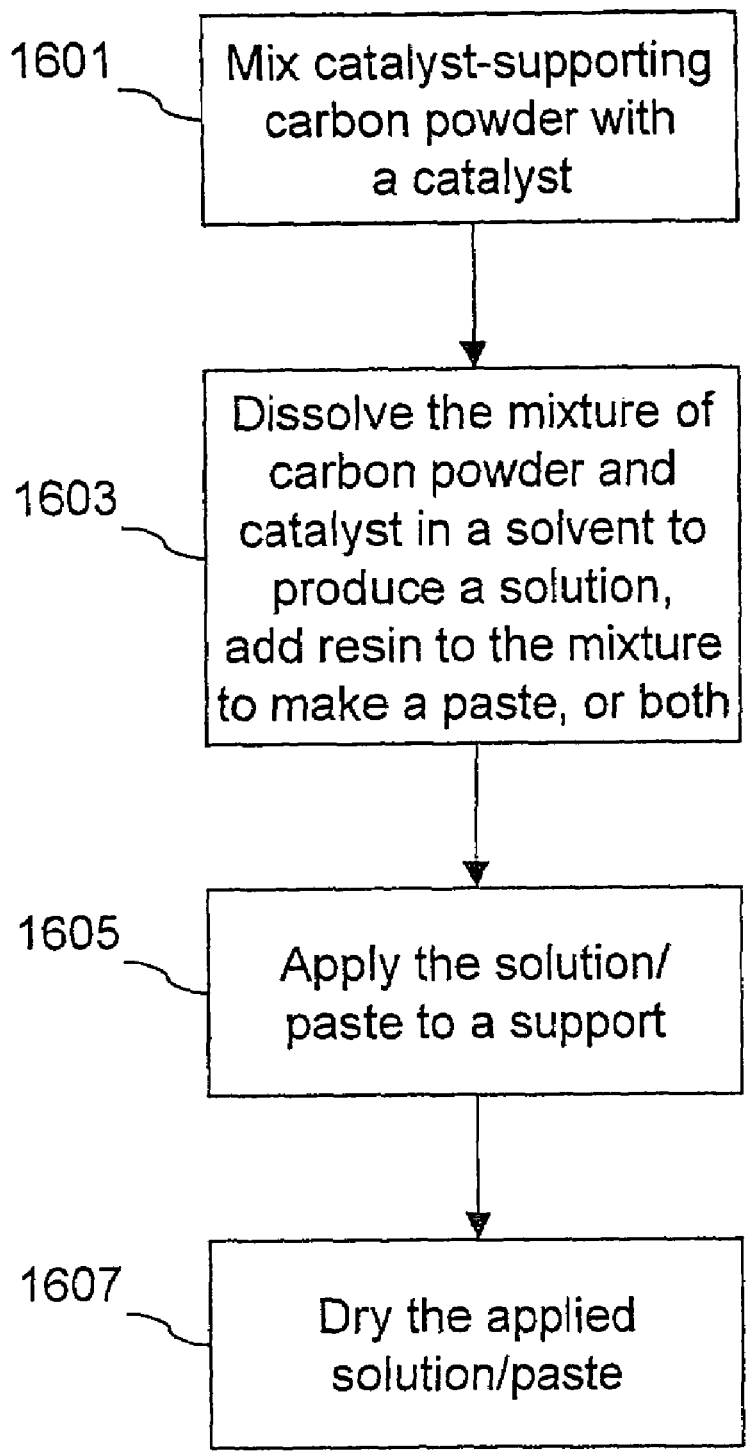
FIG. 16 is a flow chart illustrating a method of preparing an electrode of the polymer electrolyte type fuel cell illustrated in FIG. 15.

FIG. 16 is a flow chart illustrating a method of preparing an electrode of the polymer electrolyte type fuel cell illustrated in FIG. 15. Carbon powder is mixed in Step 1601 with a catalyst (for example, a platinum group noble metal catalyst). An electrically-conductive carbon black, such as Ketjen™ black or acetylene black, may be used as the carbon powder. A catalyst layer paste is produced by further mixing in Step 1603 the carbon powder, having the catalyst supported thereon, with a binder resin and optional solvents. This latter mixture may be processed by facilities such as a dissolver, a double planetary mixer, a kneader, a bead mill, an ultrasonic dispersion machine, and an ultrahigh pressure homogenizer singly or continuously in succession, to prepare the catalyst layer paste.

A perfluorosulfonic acid, which exerts an effect as a hydrogen ionically-conductive polymer electrolyte, may be used as the binder resin. Moreover, for the purpose of enhancing its bonding properties, a fluororesin, such as polytetrafluoroethylene, polyvinylidene fluoride resin and polyvinylidene fluoride-hexafluoropropylene copolymer, may be used as the binder resin. Furthermore, a treatment may be previously conducted to cause a fluororesin to be attached to the carbon powder and catalyst using a mixer, such as a Henschel mixer produced by Mitsui Mining Company, Limited.

As solvents to be mixed with the carbon powder and catalyst, water, ethyl alcohol, methyl alcohol, isopropyl alcohol, ethylene-glycol, methylene glycol, propylene glycol, methyl ethyl ketone, acetone, toluene, xylene, n-methyl-2-pyrrolidone, etc., may be used singly or in combination. The amount of these solvents to be added is preferably from about 10 to about 400 units, based on about 100 units of the catalyst powder by weight.

A gas diffusion layer is formed by, for example, a carbon paper, having both permeability to fuel gas containing hydrogen and electronic conductivity, that has been subjected to a water repellent treatment. The catalyst layer paste is then spread in Step 1605 over a support, such as the gas diffusion layer or a polymer film, to form a catalyst layer thereon. To spread the catalyst layer paste, facilities such as a comma coater, kiss coater, roll coater, doctor blade, spray coater, die coater and gravure coater may be used. The catalyst paste is then dried in Step 1607 after being spread on the support. As a drying system, there may be used infrared drying, hot air drying, or ultra-violet (UV) curing drying. The thickness of the catalyst layer thus spread and dried is, for example, from about 10 microns (μm) to about 25 μm.

Subsequently, the prepared electrode is bonded to one side of a polymer electrolyte membrane, which selectively transports hydrogen ions, and a similar electrode is bonded to the other side of the polymer electrolyte membrane. Together, the two electrodes and the polymer electrolyte membrane constitute a single cell. As the polymer electrolyte membrane, a perfluorosulfonic acid, which is a hydrogen ionically-conductive polymer electrolyte, may be used.

Figure 13:
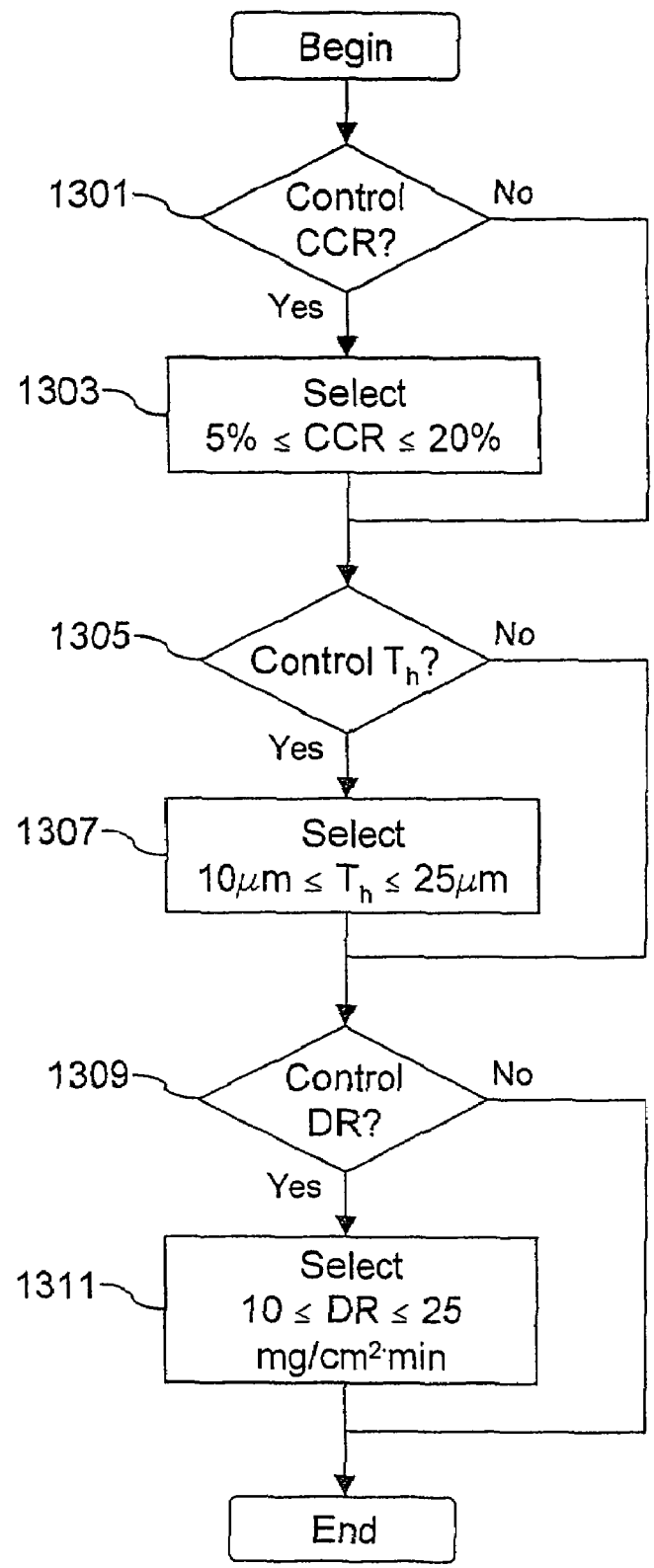
FIG. 13 is a flow chart illustrating a method of producing a fuel cell electrode according to the present invention.

FIG. 13 illustrates, with additional specificity, a method of producing a fuel cell electrode according to the present invention. According to this method, one or more properties of the manufacturing process for producing the catalyst layer may be controlled so as to greatly increase the operational life and discharge rate of a fuel cell employing this catalyst layer in an electrode. The properties that may be controlled are: (1) the ratio of platinum catalyst to carbon powder used in preparing a catalyst paste, (2) the thickness of the dried catalyst layer, and (3) the drying rate for drying the catalyst paste forming the catalyst layer. If controlling the catalyst to carbon powder ratio (CCR) is desired in Step 1301, a ratio in the range of about 5% to about 20% by weight of catalyst to carbon powder is selected 1303. If controlling the CCR is not desired or is desired in combination with another control parameter, a decision is made whether to control the thickness of the dried catalyst layer in Step 1305. If the thickness is to be controlled, a thickness in the range of about 10 μm to about 25 μm is selected in Step 1307. If controlling neither the CCR nor the thickness is desired or controlling one or both of these parameters in combination with the drying rate is desired, a decision is made whether to control the drying rate of the applied catalyst paste in Step 1309. If controlling the drying rate is desired, a drying rate in the range of about 10 to about 25 milligrams/square centimeter-·minutes (mg/cm$^2$·min) is selected in step 1311.

Figure 1:
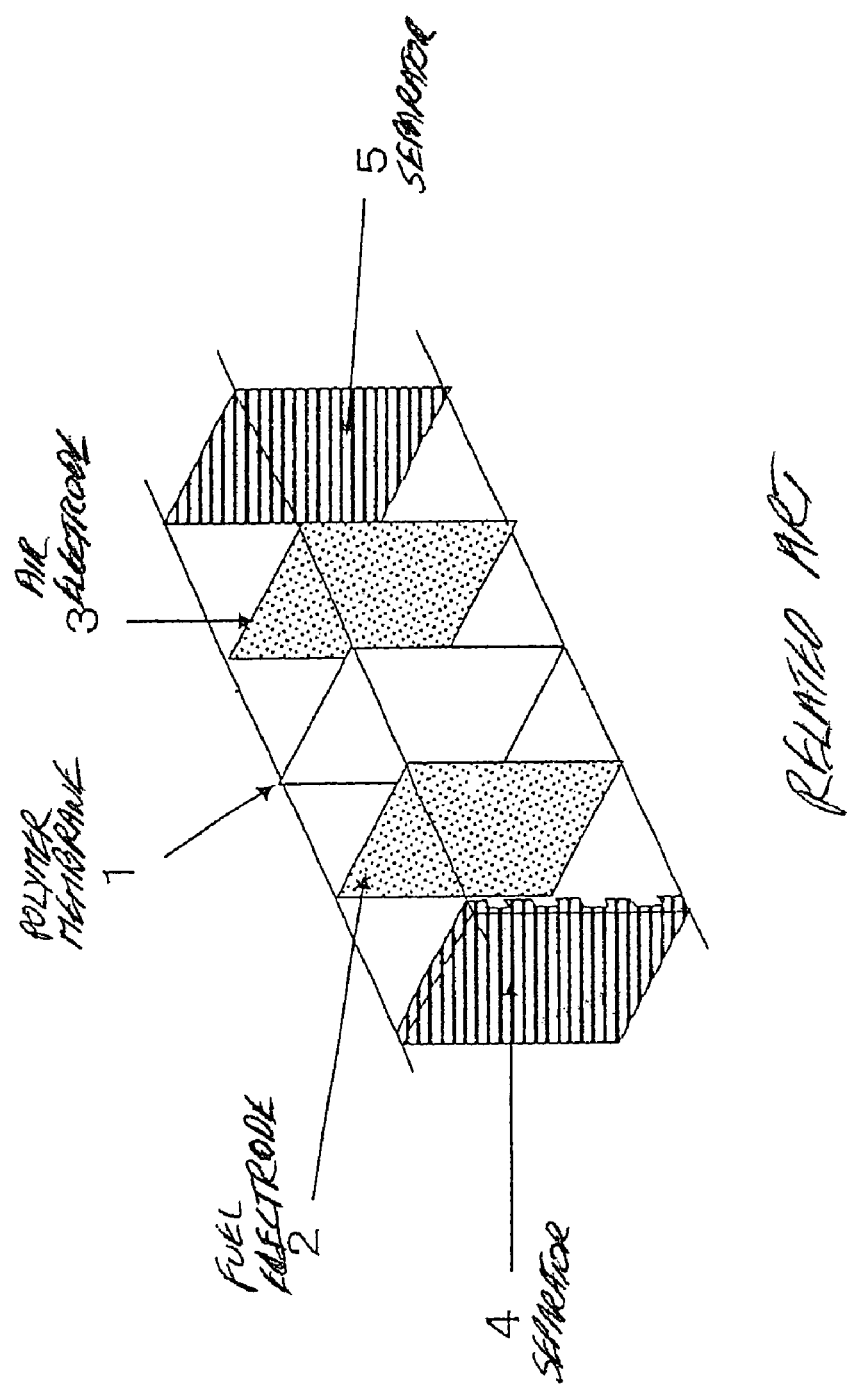
FIG. 1 is a sectional view illustrating the outline of the configuration of a single cell which is a constituent of a related art fuel cell stack.
Figure 2:
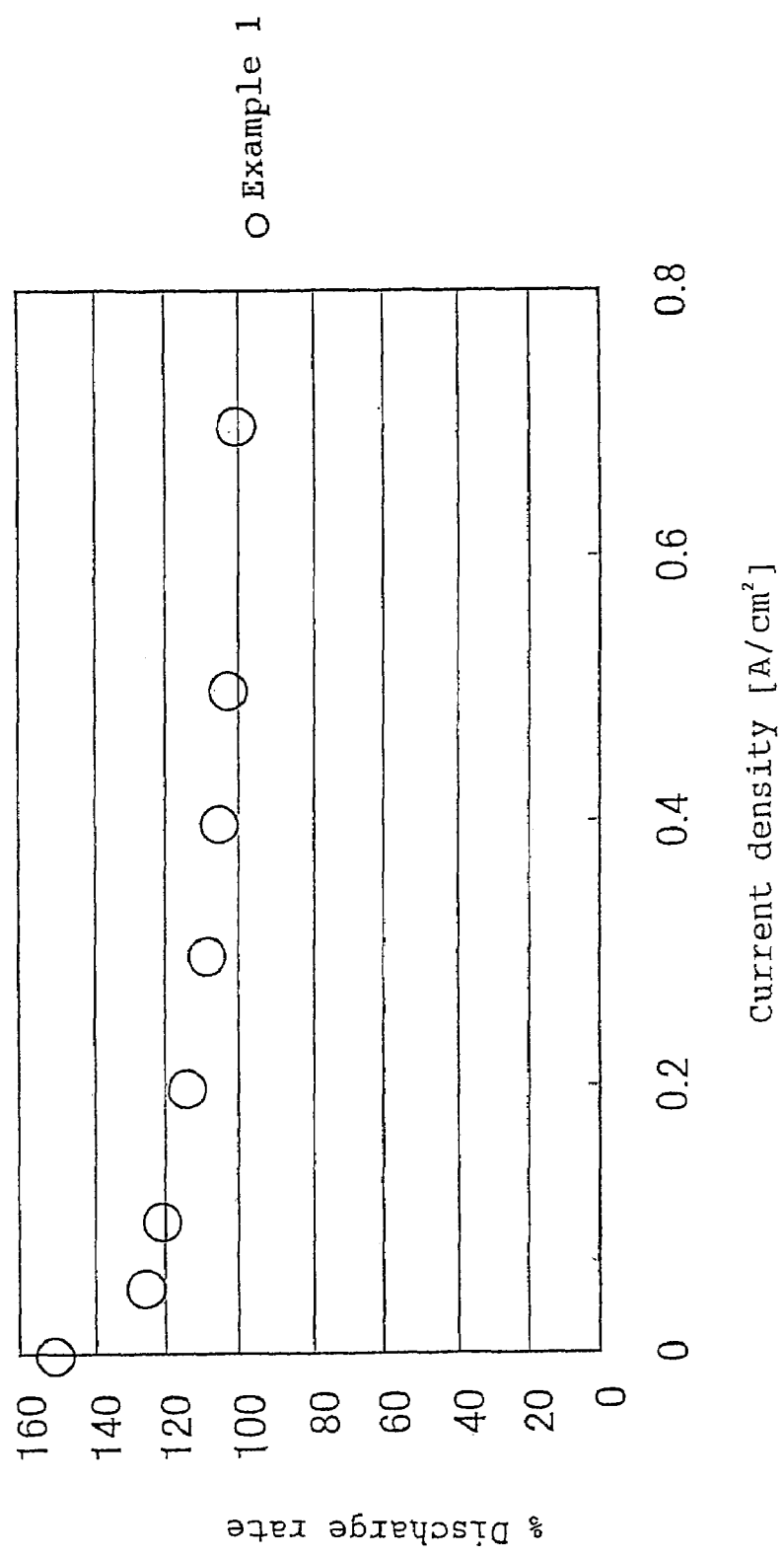
FIG. 2 is a current density-discharge rate graph of the cell of Example 1 of the present invention.
Figure 3:
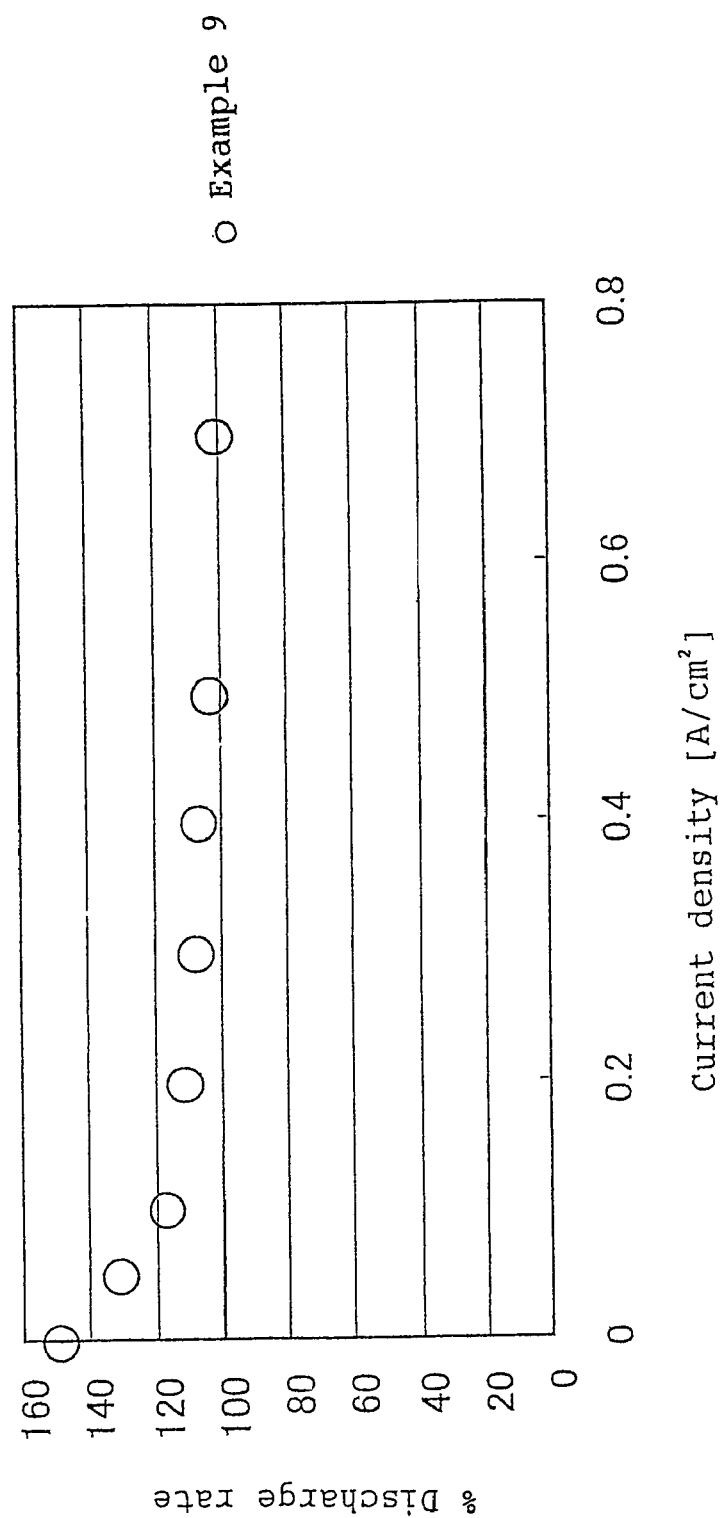
FIG. 3 is a current density-discharge rate graph of the cell of Example 9 of the present invention.
Figure 4:
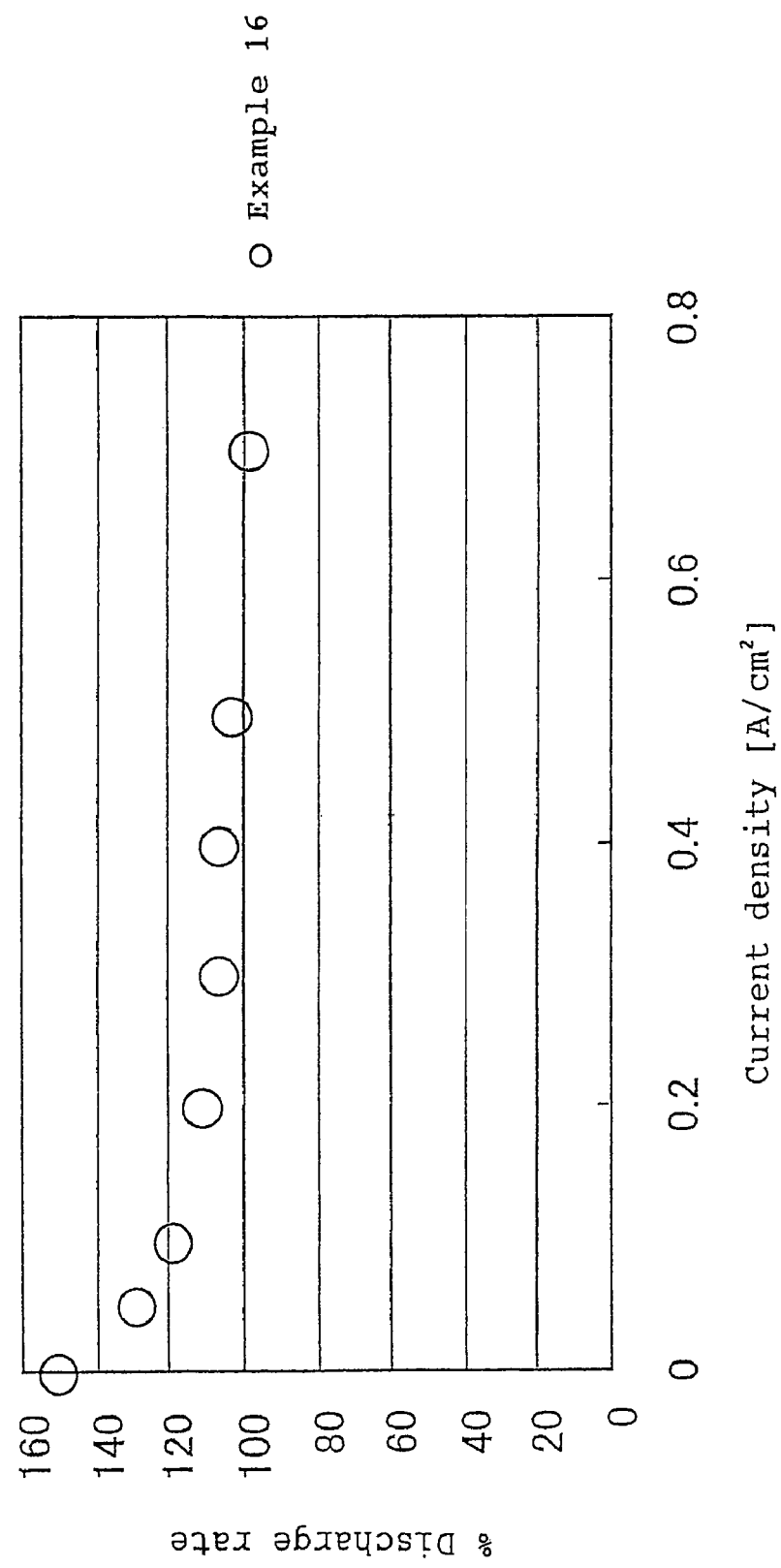
FIG. 4 is a current density-discharge rate graph of the cell of Example 16 of the present invention.
Figure 5:
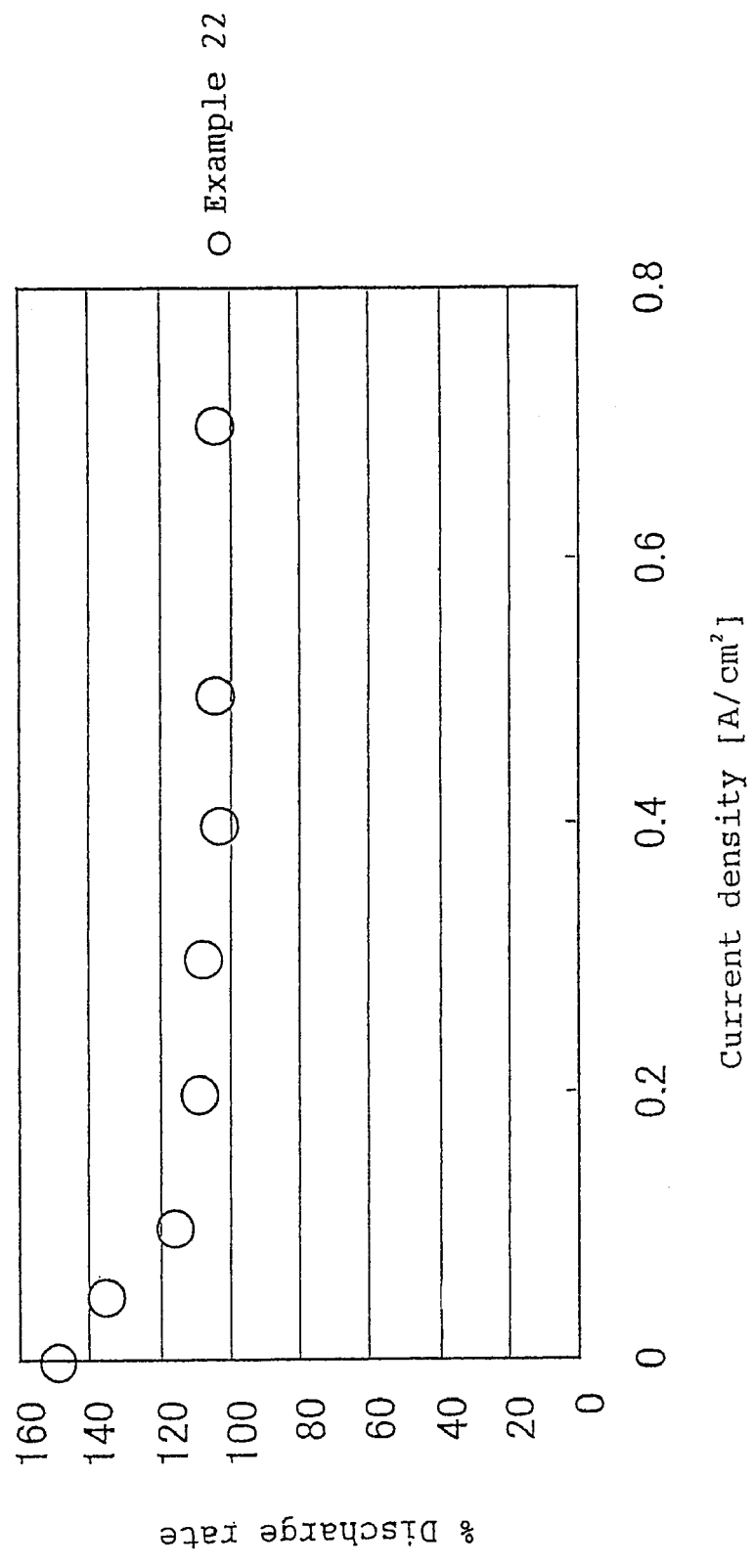
FIG. 5 is a current density-discharge rate graph of the cell of Example 22 of the present invention.
Figure 6:
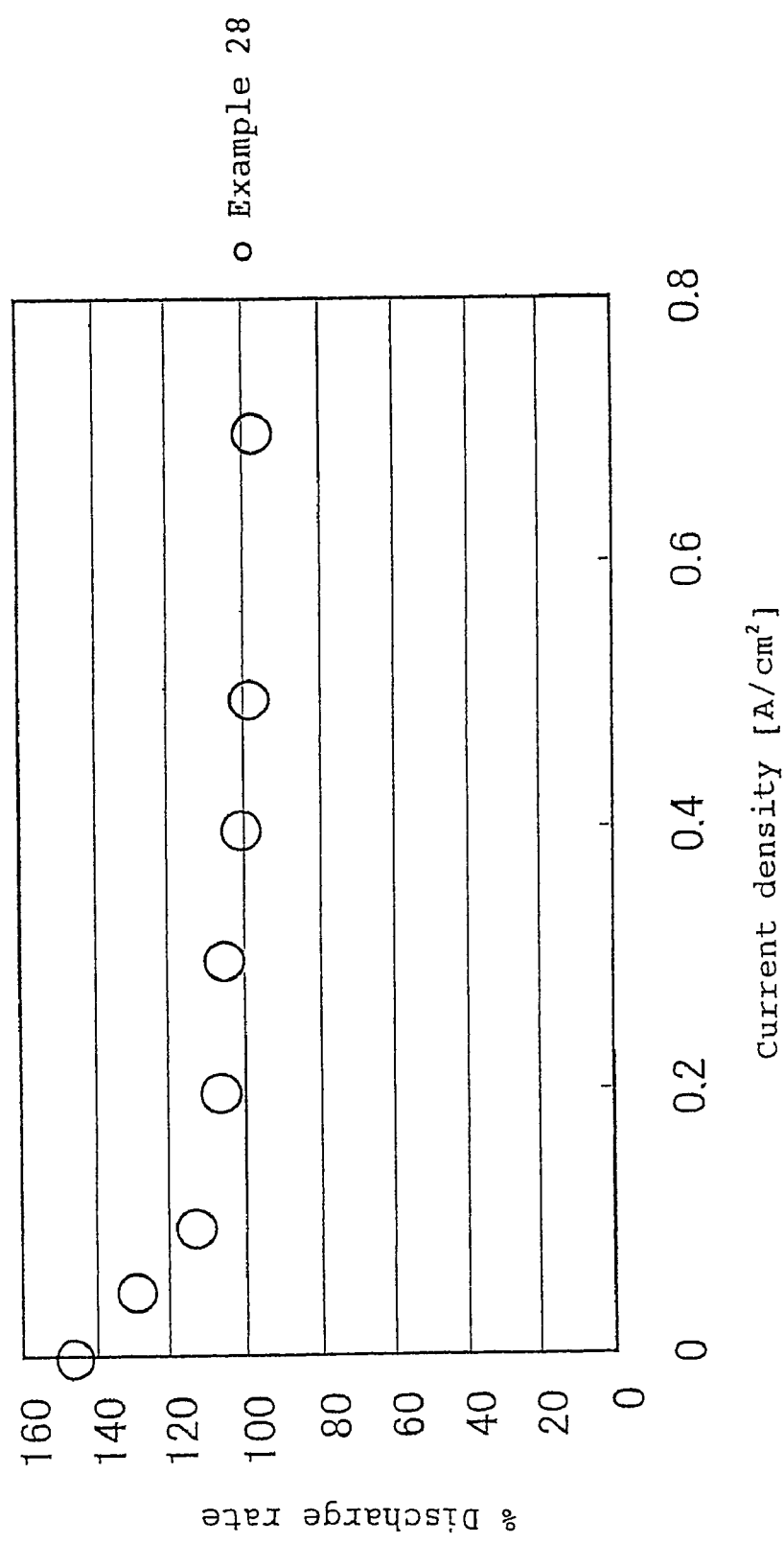
FIG. 6 is a current density-discharge rate graph of the cell of Example 28 of the present invention.
Figure 7:
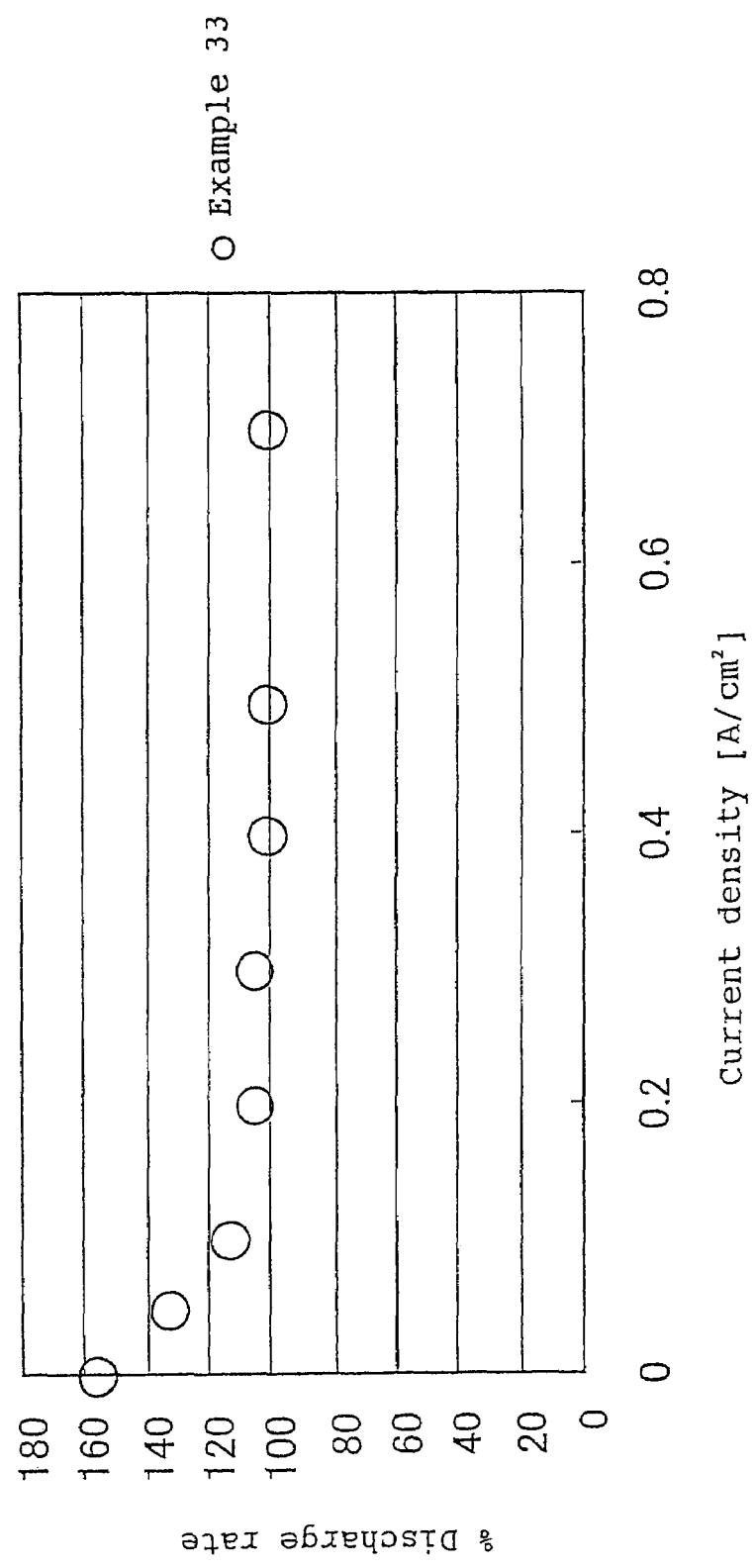
FIG. 7 is a current density-discharge rate graph of the cell of Example 33 of the present invention.
Figure 8:
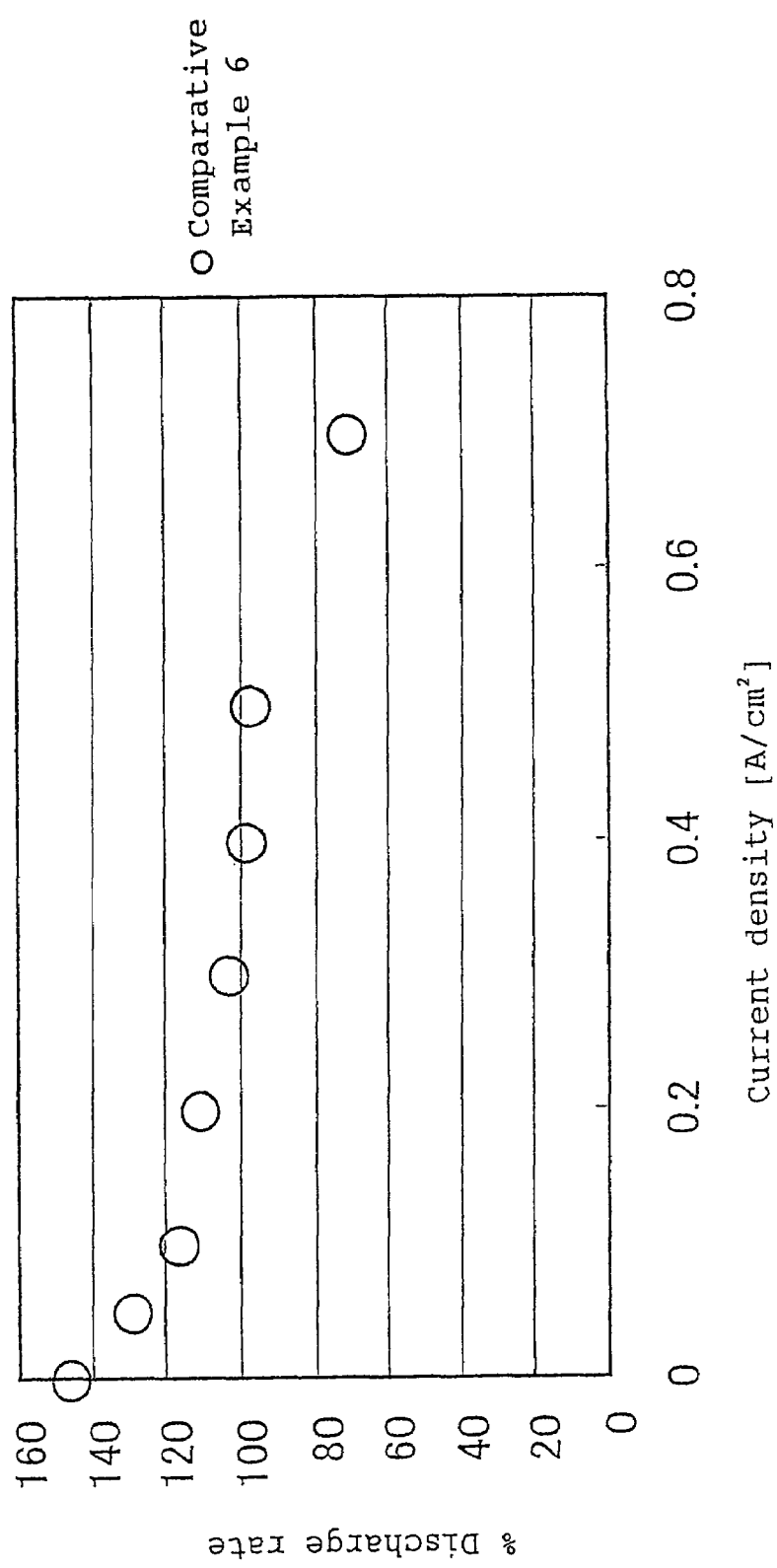
FIG. 8 is a current density-discharge rate graph of the cell of Comparative Example 6.
Figure 9:
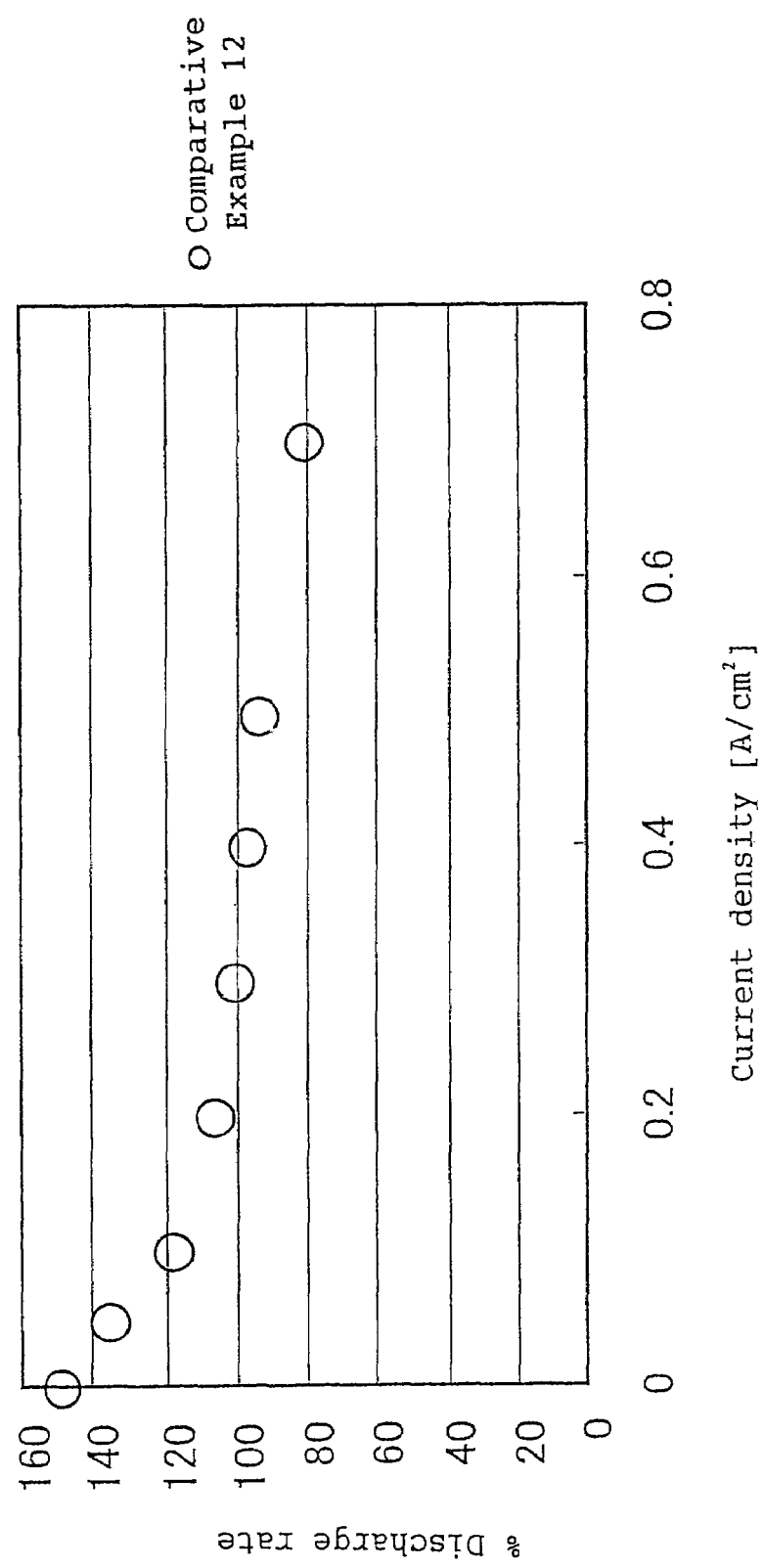
FIG. 9 is a current density-discharge rate graph of the cell of Comparative Example 12.
Figure 10:
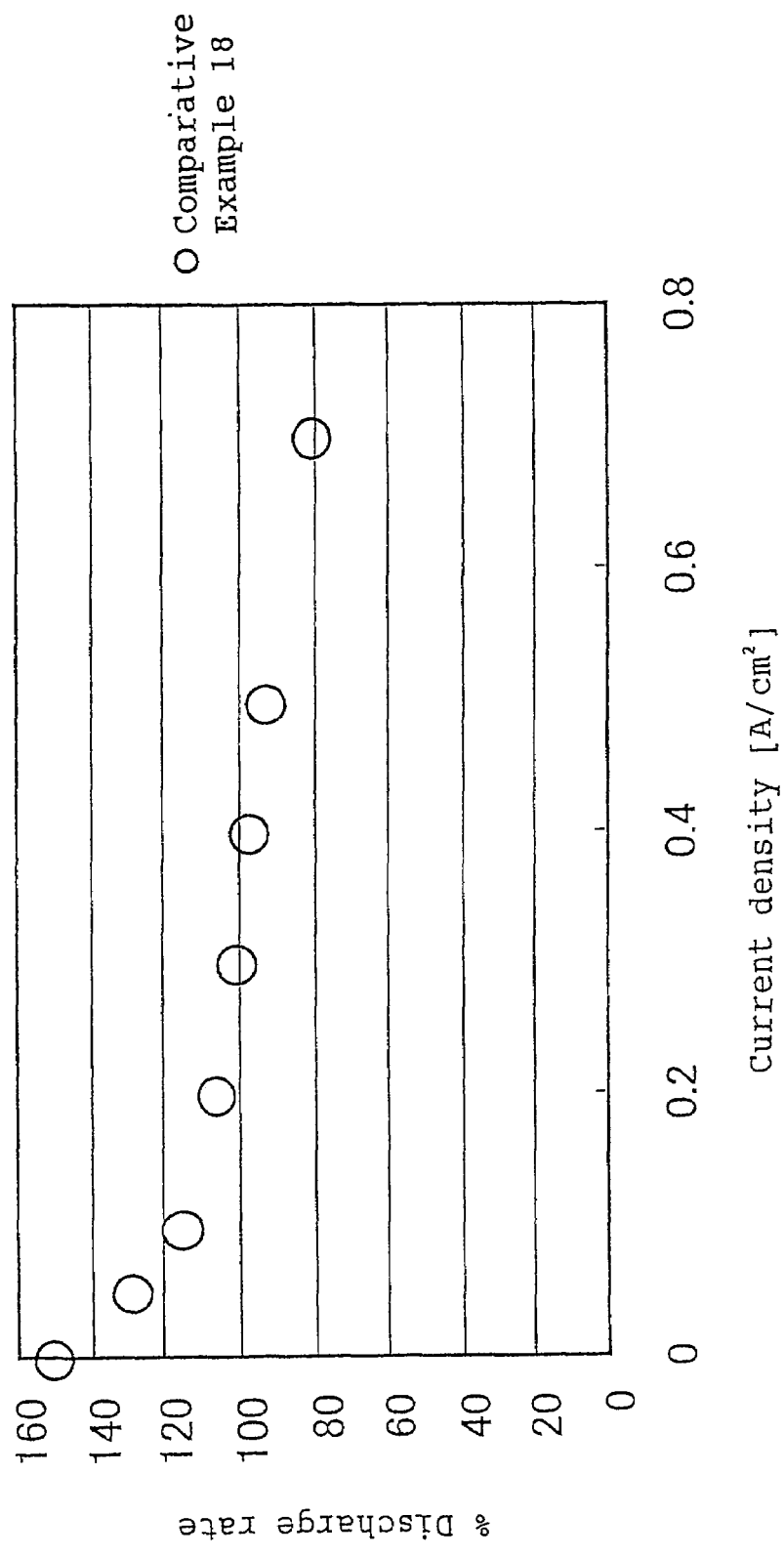
FIG. 10 is a current density-discharge rate graph of the cell of Comparative Example 18.
Figure 11:
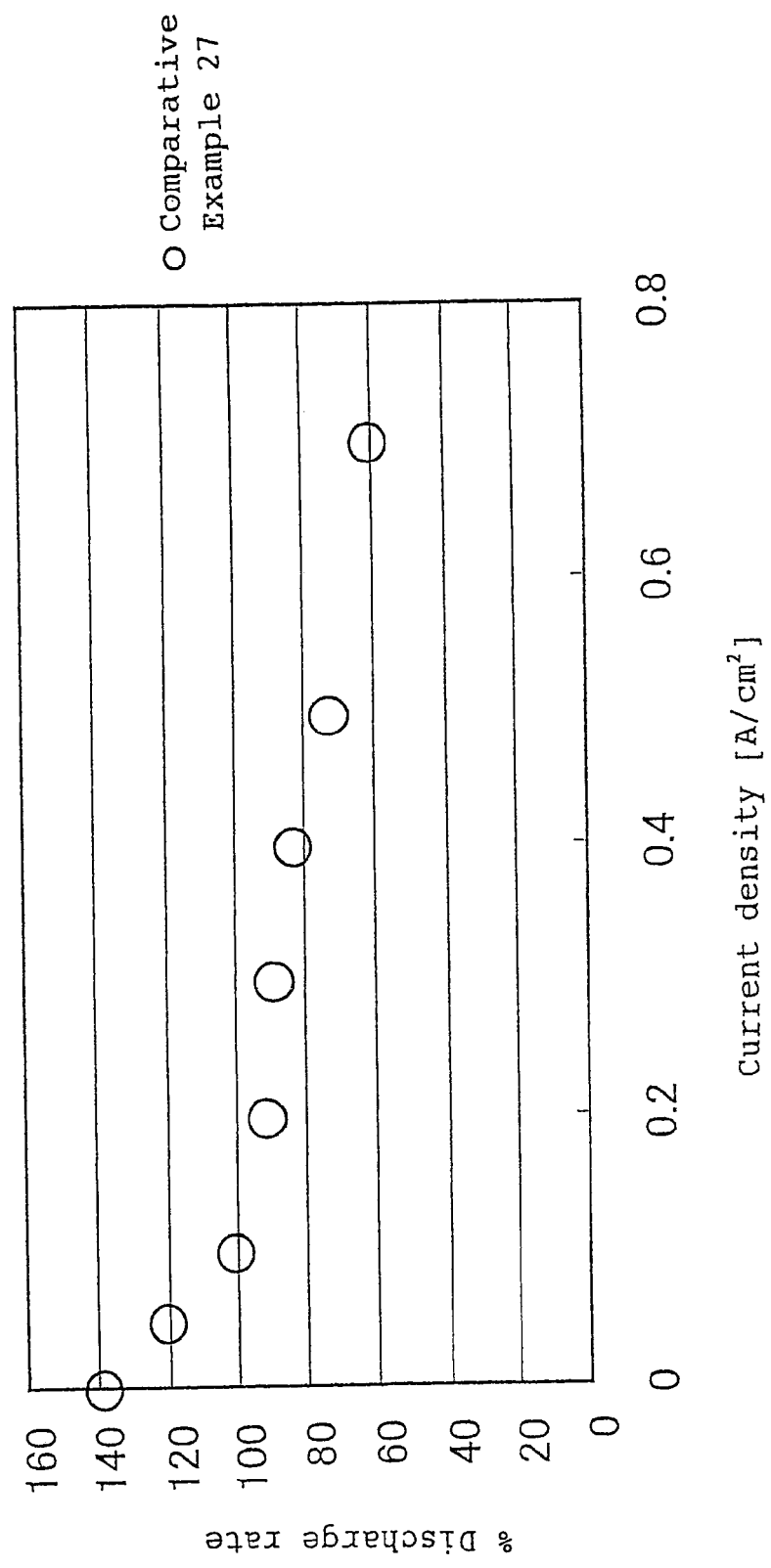
FIG. 11 is a current density-discharge rate graph of the cell of Comparative Example 27.
Figure 12:
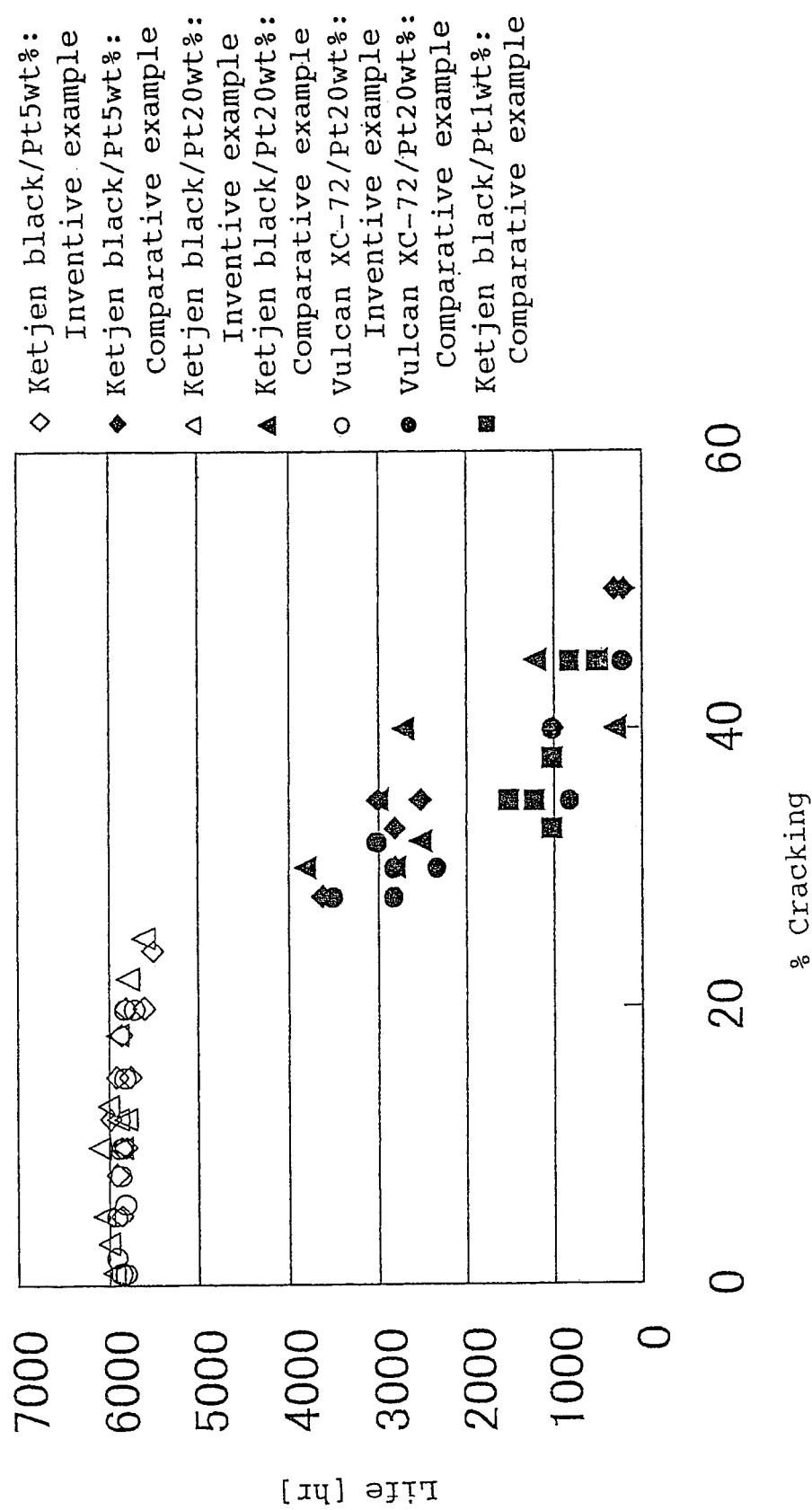
FIG. 12 is a graph illustrating the relationship between the cracking occupation area and the operational life of a fuel cell in an embodiment of the present invention.

The tolerance of the cracking occupation area of the polymer electrolyte membrane type fuel cell thus produced is not greater than about 25%, as may be determined from Table 2 below. This is a critical value at which a polymer electrolyte membrane type fuel cell can be operated as a household fuel cell, for a practical minimum lifetime of 5,000 hours. FIG. 12 illustrates a graph of a fuel cell's lifetime as a function of the cracking occupation area. As can be seen in this graph, it is necessary that the cracking occupation area be not greater than about 25% to secure a lifetime of 5,000 hours.

As may also be determined from Table 2, to ensure the cracking occupation area is not greater than about 25%, the volume resistivity of the catalyst layer is preferably not greater than about 100 ohms-centimeters (Ω·cm). When the volume resistivity is greater than about 100 Ω·cm, the resulting electrode has substantial cracking or pinholes and, thus, has lower discharge performance.

The lower limit of the volume resistivity is preferably as low as can be practicably obtained. However, since the volume resistivity of the simple body of carbon, having a catalyst supported thereon, to be used in the catalyst layer is about $10^{-3}$ Ω·cm, the lower limit of the volume resistivity of the catalyst layer is substantially about $10^{-3}$ Ω·cm.

In short, an electrode's amount of cracking occupation area and volume resistivity can be limited to a predetermined tolerance by controlling: (1) the ratio of catalyst to carbon powder used in the catalyst paste, (2) the thickness of the catalyst layer, and (3) the drying rate of the solvent used to dissolve the carbon powder and catalyst into the catalyst paste. These parameters are controlled during a process of mixing, spreading, and drying a paste, containing at least a carbon powder (for example, a finely divided powder) having a catalyst (for example, a noble metal catalyst) supported thereon, over a predetermined support and drying the coated support to form the catalyst layer.

Figure 14:
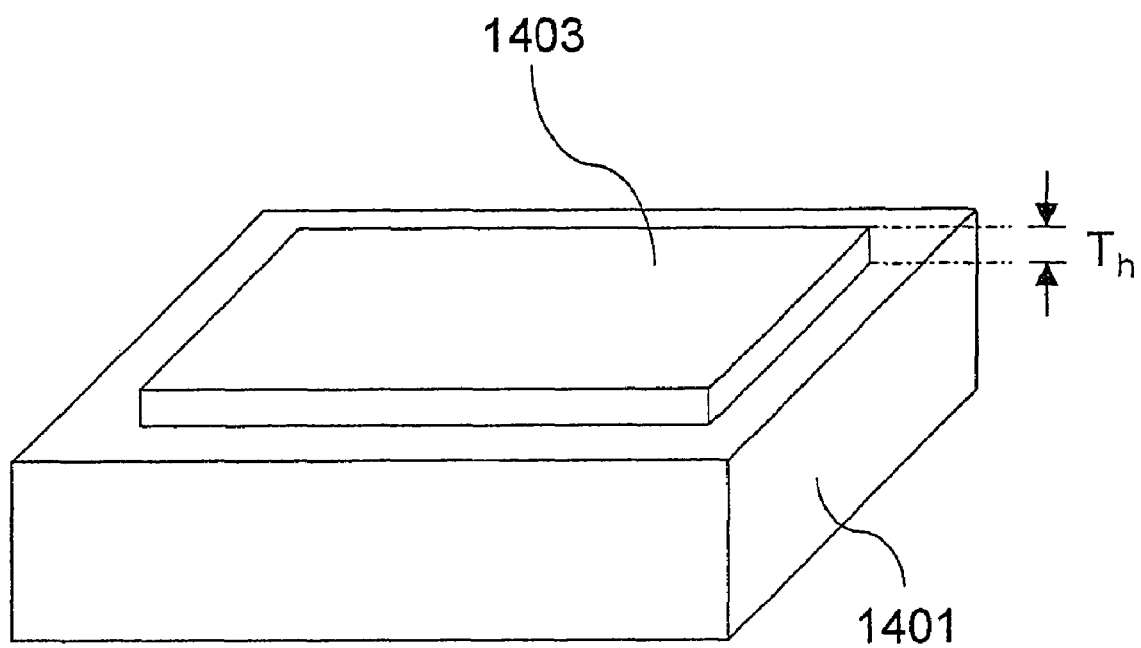
FIG. 14 illustrates a catalyst layer and support produced in accordance with the present invention.

FIG. 14 illustrates a catalyst layer and support produced in accordance with the present invention. A catalyst paste is spread over a surface of a support 1401, such as a gas diffusion layer or a polymer film, and dried. The dried catalyst paste forms a catalyst layer 1403 on the support 1401 having a thickness $T_h$.

The drying rate of the solvent within the catalyst paste may be reduced so that it is dried without causing cracking in the catalyst layer. One method for achieving the reduced drying rate optimizes the drying temperature and amount of air flow in the hot air dryer. Another method includes preparing a solvent mixture having a stepwise combination of boiling points of various solvents.

These methods may be combined with steps of spreading a catalyst layer paste over a gas diffusion layer and then drying the coated material; spreading a catalyst layer over a polymer support, such as polypropylene and polyethylene terephthalate, drying the coated material, and then subjecting the coated material to a hot press to cause a transfer; and spreading a catalyst layer paste over a polymer membrane, drying the coated material, and then laminating the coated material onto a gas diffusion layer or the like.

The gas diffusion layer can be formed by mixing acetylene black, as a carbon powder, with an aqueous dispersion of a polytetrafluoroethylene to produce an ink. The ink is spread over a carbon paper, which acts as a base material of the gas diffusion layer, and the coated material is subjected to heat treatment. During this procedure, the volume resistivity of the gas diffusion layer can be controlled through the selection of the kind of carbon paper used for the base material and the amount of acetylene black spread thereon.

The ratio of the volume resistivity of the catalyst layer to the volume resistivity of the gas diffusion layer is preferably not greater than about $10^7$. When this ratio exceeds about $10^7$, the discharge efficiency is reduced. The requirement that this ratio is preferably not greater than about $10^7$ can be easily derived from the fact that the catalyst layer volume resistivity is preferably about 100 $\Omega \cdot cm$ and the lower limit of volume resistivity for the gas diffusion layer is from about $10^{-5}$ to about $10^{-3}$ $\Omega \cdot cm$. Expressed mathematically, this ratio is $100/10^{-5}=10^7$. The lower limit of the volume resistivity of the gas diffusion layer is normally from about $10^{-5}$ to about $10^{-3}$ $\Omega \cdot cm$, and a value less than about $10^{-5}$ $\Omega \cdot cm$ is difficult to achieve.

Examples of the present invention will be described hereinafter.

EXAMPLE 1

Referring to a first embodiment of the present invention, a coating compound of catalyst layer was prepared by mixing a catalyst-supporting carbon powder, having 5% by weight of platinum catalyst supported on Ketjen™ black carbon powder, with a composition of a 1/1/1 mixture of water, isopropyl alcohol and ethylene glycol, as a solvent, using a 5 liter (l) mixer produced by Tokushu Kika Kogyo Co., Ltd. This mixture was mixed with a perfluorosulfonic acid, as a hydrogen ionically-conductive agent, and binder in an amount of 80% based on the carbon component of the carbon powder to prepare an anode catalyst paste having a solid content concentration of 20 wt %.

Subsequently, the catalyst paste was spread over a polymer film made of polyethylene terephthalate, having a thickness of 50 μm, and then dried at a drying rate of 2.5 mg/cm$^2$·min to form a catalyst layer to a thickness of 10 μm. The catalyst layer was then bonded to one side of a polymer electrolyte membrane to prepare an electrode.

To produce a gas diffusion layer, acetylene black carbon powder was mixed with an aqueous dispersion of polytetrafluoroethylene to prepare a water-repellent ink containing polytetrafluoroethylene, in a dried amount of 20% by weight. This ink was spread over a carbon paper (TGP-H-120, produced by Toray Industries, Inc.), which acts as a base material of a gas diffusion layer, so that it penetrated the carbon paper. The carbon paper and ink spread thereon were subjected to a heat treatment at 250° C., using a hot air dryer, to form a gas diffusion layer.

Subsequently, a gasket plate made of rubber was bonded to the polymer electrolyte membrane of the electrode thus prepared on the periphery thereof. A manifold hole for the passage of cooling water, fuel gas, and oxidizer gas was then formed in the electrode.

Subsequently, two sheets of electrically-conductive separators, which had a gas passage and a cooling water passage, made of a graphite sheet impregnated with a phenolic resin were prepared. A first of two separators, having an oxidizer gas passage formed thereon, was laminated to the gas diffusion layer, the electrode, a similarly produced gas diffusion layer, and a similarly produced electrode. The other separator, having a fuel gas passage formed thereon, was laminated to the open side of the latter described electrode to obtain a single cell as shown in FIG. 15.

EXAMPLE 2

A fuel cell was prepared in the same manner as in Example 1 except that the drying rate was 10 mg/cm$^2$·min.

EXAMPLE 3

A fuel cell was prepared in the same manner as in Example 1 except that the drying rate was 20 mg/cm$^2$·min.

EXAMPLE 4

A fuel cell was prepared in the same manner as in Example 1 except that the thickness of the catalyst layer was 15 μm.

EXAMPLE 5

A fuel cell was prepared in the same manner as in Example 4 except that the drying rate was 10 mg/cm$^2$·min.

EXAMPLE 6

A fuel cell was prepared in the same manner as in Example 5 except that the drying rate was 20 mg/cm$^2$·min.

EXAMPLE 7

A fuel cell was prepared in the same manner as in Example 1 except that the thickness of the catalyst layer was 20 μm.

EXAMPLE 8

A fuel cell was prepared in the same manner as in Example 7 except that the drying rate was 10 mg/cm$^2$·min.

EXAMPLE 9

A fuel cell was prepared in the same manner as in Example 8 except that the drying rate was 20 mg/cm$^2$·min.

EXAMPLE 10

A fuel cell was prepared in the same manner as in Example 1 except that the thickness of the catalyst layer was 25 μm.

EXAMPLE 11

A fuel cell was prepared in the same manner as in Example 10 except that the drying rate was 10 mg/cm$^2$·min.

EXAMPLE 12

A fuel cell was prepared in the same manner as in Example 11 except that the drying rate was 20 mg/cm$^2$·min.

EXAMPLE 13

A fuel cell was prepared in the same manner as in Example 1 except that the catalyst-supporting carbon powder was a catalyst-supporting carbon powder comprising Ketjen™ black having 20% by weight of platinum catalyst supported thereon.

EXAMPLE 14

A fuel cell was prepared in the same manner as in Example 13 except that the drying rate was 10 mg/cm$^2$·min.

EXAMPLE 15

A fuel cell was prepared in the same manner as in Example 14 except that the drying rate was 20 mg/cm$^2$·min.

EXAMPLE 16

A fuel cell was prepared in the same manner as in Example 13 except that the thickness of the catalyst layer was 15 μm.

EXAMPLE 17

A fuel cell was prepared in the same manner as in Example 16 except that the drying rate was 10 mg/cm$^2$·min.

EXAMPLE 18

A fuel cell was prepared in the same manner as in Example 17 except that the drying rate was 20 mg/cm$^2$·min.

EXAMPLE 19

A fuel cell was prepared in the same manner as in Example 13 except that the thickness of the catalyst layer was 20 μm.

EXAMPLE 20

A fuel cell was prepared in the same manner as in Example 19 except that the drying rate was 10 mg/cm$^2$·min.

EXAMPLE 21

A fuel cell was prepared in the same manner as in Example 20 except that the drying rate was 20 mg/cm$^2$·min.

EXAMPLE 22

A fuel cell was prepared in the same manner as in Example 13 except that the thickness of the catalyst layer was 25 μm.

EXAMPLE 23

A fuel cell was prepared in the same manner as in Example 22 except that drying rate was 10 mg/cm$^2$·min.

EXAMPLE 24

A fuel cell was prepared in the same manner as in Example 23 except that drying rate was 20 mg/cm$^2$·min.

EXAMPLE 25

A fuel cell was prepared in the same manner as in Example 1 except that the catalyst-supporting carbon powder was a catalyst-supporting carbon powder comprising Vulcan XC-72™ having 20% by weight of platinum catalyst supported thereon.

EXAMPLE 26

A fuel cell was prepared in the same manner as in Example 25 except that the drying rate was 10 mg/cm$^2$·min.

EXAMPLE 27

A fuel cell was prepared in the same manner as in Example 26 except that the drying rate was 20 mg/cm$^2$·min.

EXAMPLE 28

A fuel cell was prepared in the same manner as in Example 25 except that the thickness of the catalyst layer was 15 μm.

EXAMPLE 29

A fuel cell was prepared in the same manner as in Example 28 except that the drying rate was 10 mg/cm$^2$·min.

EXAMPLE 30

A fuel cell was prepared in the same manner as in Example 29 except that the drying rate was 20 mg/cm$^2$·min.

EXAMPLE 31

A fuel cell was prepared in the same manner as in Example 25 except that the thickness of the catalyst layer was 20 μm.

EXAMPLE 32

A fuel cell was prepared in the same manner as in Example 31 except that the drying rate was 10 mg/cm$^2$·min.

EXAMPLE 33

A fuel cell was prepared in the same manner as in Example 32 except that the drying rate was 20 mg/cm$^2$·min.

EXAMPLE 34

A fuel cell was prepared in the same manner as in Example 25 except that the thickness of the catalyst layer was 25 μm.

EXAMPLE 35

A fuel cell was prepared in the same manner as in Example 34 except that the drying rate was 10 mg/cm$^2$·min.

EXAMPLE 36

A fuel cell was prepared in the same manner as in Example 35 except that the drying rate was 20 mg/cm$^2$·min.

Next, various comparative examples will be described.

COMPARATIVE EXAMPLE 1

A fuel cell was prepared in the same manner as in Example 1 except that the thickness of the catalyst layer was 5 μm.

COMPARATIVE EXAMPLE 2

A fuel cell was prepared in the same manner as in Comparative Example 1 except that the drying rate was 20 mg/cm²·min.

COMPARATIVE EXAMPLE 3

A fuel cell was prepared in the same manner as in Example 1 except that the thickness of the catalyst layer was 30 μm.

COMPARATIVE EXAMPLE 4

A fuel cell was prepared in the same manner as in Comparative Example 3 except that the drying rate was 20 mg/cm²·min.

COMPARATIVE EXAMPLE 5

A fuel cell was prepared in the same manner as in Example 1 except that the thickness of the catalyst layer was 10 μm and the drying rate was 1 mg/cm²·min.

COMPARATIVE EXAMPLE 6

A fuel cell was prepared in the same manner as in Comparative Example 5 except that the drying rate was 50 mg/cm²·min.

COMPARATIVE EXAMPLE 7

A fuel cell was prepared in the same manner as in Example 1 except that the thickness of the catalyst layer was 20 μm and the drying rate was 1 mg/cm²·min.

COMPARATIVE EXAMPLE 8

A fuel cell was prepared in the same manner as in Comparative Example 7 except that the drying rate was 50 mg/cm²·min.

COMPARATIVE EXAMPLE 9

A fuel cell was prepared in the same manner as in Example 13 except that the thickness of the catalyst layer was 5 μm.

COMPARATIVE EXAMPLE 10

A fuel cell was prepared in the same manner as in Comparative Example 9 except that the drying rate was 20 mg/cm²·min.

COMPARATIVE EXAMPLE 11

A fuel cell was prepared in the same manner as in Example 13 except that the thickness of the catalyst layer was 30 μm.

COMPARATIVE EXAMPLE 12

A fuel cell was prepared in the same manner as in Comparative Example 11 except that the drying rate was 20 mg/cm²·min.

COMPARATIVE EXAMPLE 13

A fuel cell was prepared in the same manner as in Example 13 except that the thickness of the catalyst layer was 10 μm and the drying rate was 1 mg/cm²·min.

COMPARATIVE EXAMPLE 14

A fuel cell was prepared in the same manner as in Comparative Example 13 except that the drying rate was 50 mg/cm²·min.

COMPARATIVE EXAMPLE 15

A fuel cell was prepared in the same manner as in Example 13 except that the thickness of the catalyst layer was 20 μm and the drying rate was 1 mg/cm²·min.

COMPARATIVE EXAMPLE 16

A fuel cell was prepared in the same manner as in Comparative Example 15 except that the drying rate was 50 mg/cm²·min.

COMPARATIVE EXAMPLE 17

A fuel cell was prepared in the same manner as in Comparative Example 25 except that the thickness of the catalyst layer was 5 μm.

COMPARATIVE EXAMPLE 18

A fuel cell was prepared in the same manner as in Comparative Example 17 except that the drying rate was 20 mg/cm²·min.

COMPARATIVE EXAMPLE 19

A fuel cell was prepared in the same manner as in Example 25 except that the thickness of the catalyst layer was 30 μm.

COMPARATIVE EXAMPLE 20

A fuel cell was prepared in the same manner as in Comparative Example 19 except that the drying rate was 20 mg/cm²·min.

COMPARATIVE EXAMPLE 21

A fuel cell was prepared in the same manner as in Example 25 except that the thickness of the catalyst layer was 10 μm and the drying rate was 1 mg/cm²·min.

COMPARATIVE EXAMPLE 22

A fuel cell was prepared in the same manner as in Comparative Example 21 except that the drying rate was 50 mg/cm²·min.

COMPARATIVE EXAMPLE 23

A fuel cell was prepared in the same manner as in Example 25 except that the thickness of the catalyst layer was 20 μm and the drying rate was 1 mg/cm²·min.

COMPARATIVE EXAMPLE 24

A fuel cell was prepared in the same manner as in Comparative Example 23 except that the drying rate was 50 mg/cm²·min.

COMPARATIVE EXAMPLE 25

A fuel cell was prepared in the same manner as in Example 1 except that the catalyst-supporting carbon powder was a catalyst-supporting carbon powder comprising Ketjen™ black having 1% by weight of platinum catalyst supported thereon.

COMPARATIVE EXAMPLE 26

A fuel cell was prepared in the same manner as in Comparative Example 25 except that the drying rate was 20 mg/cm²·min.

COMPARATIVE EXAMPLE 27

A fuel cell was prepared in the same manner as in Comparative Example 25 except that the thickness of the catalyst layer was 15 μm.

COMPARATIVE EXAMPLE 28

A fuel cell was prepared in the same manner as in Comparative Example 27 except that the drying rate was 20 mg/cm²·min.

COMPARATIVE EXAMPLE 29

A fuel cell was prepared in the same manner as in Comparative Example 25 except that the thickness of the catalyst layer was 20 μm.

COMPARATIVE EXAMPLE 30

A fuel cell was prepared in the same manner as in Comparative Example 29 except that the drying rate was 20 mg/cm²·min.

Productions conditions of the catalyst electrodes are set forth in Table 1.

TABLE 1

|  |  | Catalyst carrier/amount of catalyst | Thickness (μm) | Drying rate (mg/cm²·min) |
|---|---|---|---|---|
| Example | 1 | Ketjen™ black/Pt5 wt % | 10 | 2.5 |
|  | 2 | " | 10 | 10 |
|  | 3 | " | 10 | 20 |
|  | 4 | " | 15 | 2.5 |
|  | 5 | " | 15 | 10 |
|  | 6 | " | 15 | 20 |
|  | 7 | " | 20 | 2.5 |
|  | 8 | " | 20 | 10 |
|  | 9 | " | 20 | 20 |
|  | 10 | " | 25 | 2.5 |
|  | 11 | " | 25 | 10 |
|  | 12 | " | 25 | 20 |
| Example | 13 | Ketjen black/Pt20 wt % | 10 | 2.5 |
|  | 14 | " | 10 | 10 |
|  | 15 | " | 10 | 20 |
|  | 16 | " | 15 | 2.5 |
|  | 17 | " | 15 | 10 |
|  | 18 | " | 15 | 20 |
|  | 19 | " | 20 | 2.5 |
|  | 20 | " | 20 | 10 |
|  | 21 | " | 20 | 20 |
|  | 22 | " | 25 | 2.5 |
|  | 23 | " | 25 | 10 |
|  | 24 | " | 25 | 20 |
| Example | 25 | Vulcan XC-72/Pt20 wt % | 10 | 2.5 |
|  | 26 | " | 10 | 10 |
|  | 27 | " | 10 | 20 |
|  | 28 | " | 15 | 2.5 |
|  | 29 | " | 15 | 10 |
|  | 30 | " | 15 | 20 |
|  | 31 | " | 20 | 2.5 |
|  | 32 | " | 20 | 10 |
|  | 33 | " | 20 | 20 |
|  | 34 | " | 25 | 2.5 |
|  | 35 | " | 25 | 10 |
|  | 36 | " | 25 | 20 |
| Comparative Example | 1 | Ketjen black/Pt5 wt % | 5 | 2.5 |
|  | 2 | " | 5 | 20 |
|  | 3 | " | 30 | 2.5 |
|  | 4 | " | 30 | 20 |
|  | 5 | " | 10 | 1 |
|  | 6 | " | 10 | 50 |
|  | 7 | " | 20 | 1 |
|  | 8 | " | 20 | 50 |
| Comparative Example | 9 | Ketjen black/Pt20 wt % | 5 | 2.5 |
|  | 10 | " | 5 | 20 |
|  | 11 | " | 30 | 2.5 |
|  | 12 | " | 30 | 20 |
|  | 13 | " | 10 | 1 |
|  | 14 | " | 10 | 50 |
|  | 15 | " | 20 | 1 |
|  | 16 | " | 20 | 50 |
| Comparative Example | 17 | Vulcan XC-72/Pt20 wt % | 5 | 2.5 |
|  | 18 | " | 5 | 20 |
|  | 19 | " | 30 | 2.5 |
|  | 20 | " | 30 | 20 |
|  | 21 | " | 10 | 1 |
|  | 22 | " | 10 | 50 |
|  | 23 | " | 20 | 1 |
|  | 24 | " | 20 | 50 |
| Comparative Example | 25 | Ketjen black/Pt1 wt % | 10 | 2.5 |
|  | 26 | " | 10 | 20 |
|  | 27 | " | 15 | 2.5 |
|  | 28 | " | 15 | 20 |
|  | 29 | " | 20 | 2.5 |
|  | 30 | " | 20 | 20 |

The electrodes and single cells thus obtained were evaluated for the following properties.

(1) Cracking on Electrode:

Each electrode was subjected to segmentation to determine the percentage of cracking occupation area to the total area of the catalyst layer.

(2) Electrode Volume Resistivity:

Each electrode was measured with a resistivity meter to calculate its volume resistivity in Ω·cm.

(3) Discharge Rate, Life Performance:

Each cell was subjected to a discharge test at a cell temperature of 70° C., a fuel gas utilization rate (Uf) of 70% and an air utilization ratio (Uo) of 40% with a modified fuel gas (i.e., carbon dioxide: 25%; carbon monoxide: 50 parts per million (ppm); hydrogen gas: balance) and air supplied onto the fuel electrode and the air electrode, respectively. Gas moistening was accomplished by passing the modified fuel gas and air through a bubbler at 70° C. to adjust the dew point. FIGS. 2 to 11 illustrate the current-voltage characteristics of the hydrogen-air type fuel cells of both the Examples of the present invention and the Comparative Examples. The discharge rate data were evaluated relative to the voltage at 0.7 A/cm$^2$ of Example 1 as 100%.

FIG. 12 illustrates examples of the life performance of these cells. The life performance is represented relative to the initial voltage of the respective cell as 100%. The time at which the cell produces only 90% of the initial cell voltage value is identified as the durability or the life performance time.

Table 2 shows the evaluation results of the electrodes and cells.

TABLE 2

|  |  | Catalyst carrier/amount of catalyst | Thick. (μm) | Drying rate (mg/cm$^2$ · min) | Cracking occuptn. area % | Volume resist. (Ω · cm) | % Discharge rate | Life performance (hr) |
|---|---|---|---|---|---|---|---|---|
| Example | 1 | Ketjen black/Pt5 wt % | 10 | 2.5 | 5 | 1 | 100 | 5,850 |
|  | 2 | " | 10 | 10 | 8 | 2 | 100 | 5,900 |
|  | 3 | " | 10 | 20 | 15 | 4 | 98 | 5,900 |
|  | 4 | " | 15 | 2.5 | 8 | 1.5 | 98 | 5,900 |
|  | 5 | " | 15 | 10 | 12 | 5 | 100 | 5,960 |
|  | 6 | " | 15 | 20 | 18 | 8 | 102 | 5,850 |
|  | 7 | " | 20 | 2.5 | 10 | 2 | 100 | 5,800 |
|  | 8 | " | 20 | 10 | 10 | 6 | 98 | 5,850 |
|  | 9 | " | 20 | 20 | 20 | 12 | 100 | 5,800 |
|  | 10 | " | 25 | 2.5 | 15 | 5 | 100 | 5,750 |
|  | 11 | " | 25 | 10 | 20 | 10 | 100 | 5,600 |
|  | 12 | " | 25 | 20 | 24 | 16 | 98 | 5,500 |
| Example | 13 | Ketjen black/Pt20 wt % | 10 | 2.5 | 1 | 2 | 100 | 5,950 |
|  | 14 | " | 10 | 10 | 3 | 2 | 100 | 6,000 |
|  | 15 | " | 10 | 20 | 10 | 3 | 102 | 6,100 |
|  | 16 | " | 15 | 2.5 | 5 | 2 | 98 | 6,050 |
|  | 17 | " | 15 | 10 | 12 | 5 | 100 | 5,900 |
|  | 18 | " | 15 | 20 | 18 | 10 | 96 | 5,900 |
|  | 19 | " | 20 | 2.5 | 10 | 2.5 | 102 | 5,850 |
|  | 20 | " | 20 | 10 | 13 | 10 | 102 | 6,000 |
|  | 21 | " | 20 | 20 | 22 | 15 | 100 | 5,770 |
|  | 22 | " | 25 | 2.5 | 12 | 3 | 103 | 5,800 |
|  | 23 | " | 25 | 10 | 18 | 15 | 102 | 5,900 |
|  | 24 | " | 25 | 20 | 25 | 20 | 105 | 5,600 |
| Example | 25 | Vulcan XC-72/Pt20 wt % | 10 | 2.5 | 1 | 1 | 95 | 5,850 |
|  | 26 | " | 10 | 10 | 1 | 1 | 96 | 5,800 |
|  | 27 | " | 10 | 20 | 2 | 2 | 96 | 5,900 |
|  | 28 | " | 15 | 2.5 | 5 | 1.5 | 97 | 5,900 |
|  | 29 | " | 15 | 10 | 6 | 1.5 | 98 | 5,800 |
|  | 30 | " | 15 | 20 | 8 | 6 | 95 | 5,850 |
|  | 31 | " | 20 | 2.5 | 6 | 2 | 93 | 5,800 |
|  | 32 | " | 20 | 10 | 10 | 4 | 100 | 5,850 |
|  | 33 | " | 20 | 20 | 15 | 8 | 100 | 5,800 |
|  | 34 | " | 25 | 2.5 | 20 | 10 | 102 | 5,800 |
|  | 35 | " | 25 | 10 | 20 | 10 | 100 | 5,800 |
|  | 36 | " | 25 | 20 | 20 | 12 | 100 | 5,700 |
| Comparative Example | 1 | Ketjen black/Pt5 wt % | 5 | 2.5 | 30 | 25 | 85 | 2,800 |
|  | 2 | " | 5 | 20 | 35 | 30 | 80 | 3,000 |
|  | 3 | " | 30 | 2.5 | 35 | 80 | 80 | 2,500 |
|  | 4 | " | 30 | 20 | 40 | 100 | 75 | 1,000 |
|  | 5 | " | 10 | 1 | 28 | 40 | 88 | 3,600 |
|  | 6 | " | 10 | 50 | 50 | 90 | 70 | 300 |
|  | 7 | " | 20 | 1 | 33 | 30 | 85 | 2,800 |
|  | 8 | " | 20 | 50 | 50 | 120 | 75 | 200 |
| Comparative Example | 9 | Ketjen black/Pt20 wt % | 5 | 2.5 | 32 | 30 | 80 | 2,500 |
|  | 10 | " | 5 | 20 | 30 | 30 | 75 | 2,800 |
|  | 11 | " | 30 | 2.5 | 40 | 60 | 88 | 2,700 |
|  | 12 | " | 30 | 20 | 45 | 100 | 80 | 1,200 |
|  | 13 | " | 10 | 1 | 30 | 40 | 85 | 3,800 |
|  | 14 | " | 10 | 50 | 45 | 95 | 75 | 500 |
|  | 15 | " | 20 | 1 | 35 | 35 | 85 | 3,000 |
|  | 16 | " | 20 | 50 | 40 | 90 | 80 | 300 |
| Comparative Example | 17 | Vulcan XC-72/Pt20 wt % | 5 | 2.5 | 28 | 30 | 85 | 3,500 |
|  | 18 | " | 5 | 20 | 32 | 35 | 80 | 3,000 |
|  | 19 | " | 30 | 2.5 | 30 | 40 | 85 | 2,300 |
|  | 20 | " | 30 | 20 | 35 | 50 | 75 | 800 |

TABLE 2-continued

|  |  | Catalyst carrier/amount of catalyst | Thick. (μm) | Drying rate (mg/cm$^2$·min) | Cracking occuptn. area % | Volume resist. (Ω·cm) | % Discharge rate | Life performance (hr) |
|---|---|---|---|---|---|---|---|---|
|  | 21 | " | 10 | 1 | 28 | 40 | 88 | 2,800 |
|  | 22 | " | 10 | 50 | 40 | 90 | 70 | 1,000 |
|  | 23 | " | 20 | 1 | 30 | 35 | 85 | 2,800 |
|  | 24 | " | 20 | 50 | 45 | 120 | 75 | 200 |
| Comparative Example | 25 | Ketjen black/Pt1 wt % | 10 | 2.5 | 35 | 80 | 75 | 2,000 |
|  | 26 | " | 10 | 20 | 38 | 200 | 70 | 2,500 |
|  | 27 | " | 15 | 2.5 | 38 | 120 | 75 | 2,200 |
|  | 28 | " | 15 | 20 | 45 | 180 | 70 | 800 |
|  | 29 | " | 20 | 2.5 | 35 | 100 | 78 | 2,500 |
|  | 30 | " | 20 | 20 | 45 | 200 | 70 | 500 |

As can be seen in the results, the cracking occupation area is preferably not greater than 25%. Also, the volume resistivity is preferably not greater than 100 Ω·cm.

As may be determined by inspection of Table 2, a fuel cell produced according to the present invention experiences a higher discharge rate and operational lifetime when the thickness of the catalyst layer is limited to the range of 10 μm to 25 μm, the catalyst to carbon weight ratio is limited to the range of 5 wt % to 20 wt %, or the drying rate of the solvent is limited to the range of 2.5 mg/cm$^2$·min to 20 mg/cm$^2$·min. Similarly, the fuel cell experiences a higher discharge rate and operational lifetime when a combination of two or more of the above parameters are so limited.

Referring further to a particularly preferred range of numeral values, the thickness is from 10 μm to 25 μm; as the carbon powder having a noble metal supported thereon, there is used acetylene black having 5% by weight of platinum supported thereon, acetylene black having 20% by weight of platinum supported thereon or Vulcan XC-72 having 20% by weight of platinum supported thereon; as the solvent, there is used a mixture of water, ethanol, isopropyl alcohol and ethylene glycol; and the drying rate is predetermined to be from 2.5 mg/cm$^2$·min to 20 mg/cm$^2$·min.

The fuel cell according to the present invention can be applied to business and household use.

The embodiments of implementation of the present invention have been described with reference to the method of producing an anode catalyst layer of fuel cell. However, similar results were obtained with a cathode catalyst layer.

As can be seen in the description given above, the present invention can provide a method of producing a high quality polymer electrolyte type fuel cell that undergoes little or no leakage and exhibits an improved life performance.

The foregoing description and examples have been presented for purposes of illustration. They are not intended to be exhaustive or to limit the invention to the precise form disclosed. Hence, many modifications and variations are possible in light of the above teachings without departing from the broad inventive concept thereof. It is understood, therefore, that this invention is not limited to the particular embodiments disclosed, but it is intended to cover modifications within the spirit and scope of the present invention as defined by the appended claims.

This application is based on Japanese Patent Application No. 2002-070350 filed on Mar. 14, 2002 and PCT/JP03/02973 filed Mar. 13, 2003, the entire technical contents of which are expressly incorporated by reference herein.

What is claimed is:

1. A method of producing an electrode of a polymer electrolyte membrane fuel cell comprising a polymer electrolyte membrane, an electrode contacting the polymer electrolyte membrane and including a gas diffusion layer and a catalyst layer provided in contact with the polymer electrolyte membrane, and a separator provided in contact with the gas diffusion layer, said method comprising: (a) providing a polymer film; (b) providing a gas diffusion layer; (c) providing a paste including at least a carbon powder having a catalyst supported thereon mixed in a solvent, (d) spreading said paste over said polymer film to provide a coated support, (e) drying the coated support to evaporate said solvent to form a catalyst layer on said support, (f) layering said gas diffusion layer and said catalyst layer with one another to form an electrode; and (g) controlling a cracking occupation area on the electrode to a predetermined tolerance by controlling at least one of (a) a thickness of said catalyst layer formed in step (e), (b) a kind of carbon in said carbon powder having the catalyst supported thereon, and (c) a drying rate of said coated support in step (e).

2. The method according to claim 1, wherein said tolerance of the cracking occupation area is not greater than about 25%.

3. The method according to claim 1, wherein said thickness is controlled to be from about 10 μm to about 25 μm, the kind of carbon having the catalyst supported thereon is carbon having from about 5 wt % to about 20 wt % of platinum supported thereon, and the drying rate of the solvent is from about 2.5 mg/cm$^2$·min to about 20 mg/cm$^2$·min.

4. The method according to claim 1, wherein the drying rate of the solvent is adjusted by controlling at least one of the kind of solvent and a drying temperature.

5. The method according to claim 1, wherein the polymer electrolyte membrane fuel cell is used as a household fuel cell.

6. The method according to claim 1, wherein said catalyst is a noble metal catalyst.

7. The method according to claim 1, wherein said carbon powder is finely divided.

* * * * *